United States Patent
Huang et al.

(10) Patent No.: US 11,997,538 B2
(45) Date of Patent: May 28, 2024

(54) COMMUNICATION METHOD AND COMMUNICATIONS APPARATUS

(71) Applicant: Huawei Technologies Co., Ltd., Shenzhen (CN)

(72) Inventors: Qufang Huang, Shenzhen (CN); Qiang Fan, Hefei (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 17/487,821

(22) Filed: Sep. 28, 2021

(65) Prior Publication Data

US 2022/0022099 A1 Jan. 20, 2022

Related U.S. Application Data

(63) Continuation of application No. PCT/CN2020/079935, filed on Mar. 18, 2020.

(30) Foreign Application Priority Data

Mar. 29, 2019 (CN) .......................... 201910252336.X

(51) Int. Cl.
*H04W 4/00* (2018.01)
*H04L 47/28* (2022.01)
(Continued)

(52) U.S. Cl.
CPC ............. *H04W 28/10* (2013.01); *H04L 47/28* (2013.01); *H04W 84/042* (2013.01)

(58) Field of Classification Search
CPC ... H04W 28/10; H04W 84/042; H04W 72/20; H04W 28/26; H04W 36/0044;
(Continued)

(56) References Cited

U.S. PATENT DOCUMENTS 5,682,384 A * 10/1997 Zarros .................. H04J 3/0632
370/517
7,126,937 B2 * 10/2006 Crosbie ................. H04W 56/00
370/347
(Continued)

FOREIGN PATENT DOCUMENTS

CN 106375054 A 2/2017
CN 108141897 A 6/2018
(Continued)

OTHER PUBLICATIONS

"3rd Generation Partnership Project; Technical Specification Group Services and System Aspects; Study on enhancement of 5G System (5GS) for vertical and Local Area Network (LAN) services (Release 16)," 3GPP TR 23.734 V16.1.0, total 111 pages, 3rd Generation Partnership Project, Valbonne, France (Mar. 2019).
(Continued)

*Primary Examiner* — Stephen M D Agosta
(74) *Attorney, Agent, or Firm* — Leydig, Voit & Mayer, Ltd.

(57) ABSTRACT

A communication method enables a base station to allocate a radio resource to a data packet of a time sensitive networking (TSN) network in a scenario in which the TSN network transmits the data packet through a 5G network. The method includes: obtaining, by an access network device, a first traffic pattern, and allocating a radio resource to a first traffic based on the first traffic pattern. The first traffic pattern includes time information of the first traffic with respect to a first clock. The first clock is a clock used by a first network. The access network device belongs to the
(Continued)

first network. The time information includes a time point and/or a period at/in which a data packet of the first traffic arrives at the first network.

7 Claims, 13 Drawing Sheets

(51) Int. Cl.
*H04W 28/10* (2009.01)
*H04W 84/04* (2009.01)

(58) Field of Classification Search
CPC . H04W 36/0072; H04W 56/00; H04W 28/16; H04W 36/0058; H04W 36/08; H04W 72/04; H04L 47/28; H04L 47/762; H04L 47/826
See application file for complete search history.

(56) References Cited

U.S. PATENT DOCUMENTS

| | | | |
|---|---|---|---|
| 9,185,003 B1 | 11/2015 | Allen | |
| 9,998,247 B1* | 6/2018 | Choudhury | H04J 3/0667 |
| 2002/0114354 A1* | 8/2002 | Sinha | H04L 7/042 |
| | | | 370/280 |
| 2002/0172226 A1* | 11/2002 | Staats | H04L 12/40058 |
| | | | 370/503 |
| 2004/0062280 A1* | 4/2004 | Jeske | H04J 3/0667 |
| | | | 370/519 |
| 2006/0126437 A1* | 6/2006 | Smith | H04J 3/0667 |
| | | | 368/46 |
| 2007/0116058 A1* | 5/2007 | Rausch | H04J 3/0652 |
| | | | 370/503 |
| 2009/0243934 A1* | 10/2009 | Ameti | G01S 5/0009 |
| | | | 342/465 |
| 2011/0007650 A1* | 1/2011 | Nam | G01S 5/14 |
| | | | 370/252 |
| 2011/0106968 A1* | 5/2011 | Froehlich | H04J 3/0667 |
| | | | 709/232 |
| 2013/0336435 A1* | 12/2013 | Akkihal | H04J 3/0673 |
| | | | 375/356 |
| 2014/0281037 A1* | 9/2014 | Spada | H04J 3/0641 |
| | | | 709/248 |
| 2016/0329979 A1* | 11/2016 | Hansson | H04L 43/0864 |
| 2017/0034797 A1* | 2/2017 | Parulkar | H04W 56/001 |
| 2017/0126526 A1* | 5/2017 | Hansson | H04L 43/0852 |
| 2018/0302869 A1* | 10/2018 | Hollar | H04W 56/0025 |
| 2019/0199286 A1* | 6/2019 | Hollar | H04B 17/12 |
| 2020/0021959 A1* | 1/2020 | Kraeling | H04W 84/10 |
| 2020/0112975 A1* | 4/2020 | Moon | H04W 8/04 |
| 2020/0351752 A1* | 11/2020 | Sivasiva Ganesan | |
| | | | H04W 40/246 |
| 2020/0351969 A1* | 11/2020 | Miklós | H04W 4/70 |
| 2021/0007160 A1* | 1/2021 | Sivasiva Ganesan | |
| | | | H04W 28/0268 |
| 2021/0084713 A1* | 3/2021 | Miklós | H04W 92/045 |
| 2021/0282045 A1* | 9/2021 | Liu | H04W 28/086 |
| 2022/0006549 A1* | 1/2022 | Wang | H04J 3/12 |
| 2022/0021623 A1* | 1/2022 | Liu | H04L 47/27 |
| 2022/0022088 A1* | 1/2022 | Gebert | H04L 69/28 |
| 2022/0394647 A1* | 12/2022 | Moon | H04J 3/0673 |
| 2023/0068462 A1* | 3/2023 | Moon | H04W 56/001 |
| 2023/0077354 A1* | 3/2023 | Moon | H04W 28/0268 |

FOREIGN PATENT DOCUMENTS

| | | |
|---|---|---|
| CN | 108173617 A | 6/2018 |
| CN | 109120528 A | 1/2019 |
| CN | 109257780 A | 1/2019 |
| EP | 3163787 A1 | 5/2017 |
| RU | 2678661 C1 | 1/2019 |

OTHER PUBLICATIONS

"3rd Generation Partnership Project; Technical Specification Group Services and System Aspects; Study on enhancement of 5GS for Vertical and LAN Services (Release 16)," 3GPP TR 23.734 DRAFT V16.0.0+, total 110 pages, 3rd Generation Partnership Project, Valbonne, France (Feb. 2019).

"Knowledge of TSN traffic information to gNB," 3GPP TSG-RAN WG2 #104, Athens, Greece, R2-1901975, Total 5 pages, 3rd Generation Partnership Project, Valbonne, France (Feb. 25-Mar. 1, 2019).

"Summary of e-mail discussion on TSN traffic patterns (with TP)," 3GPP TSG-RAN WG2 #105, Athens, Greece, R2-1900635, Total 33 pages, 3rd Generation Partnership Project, Valbonne, France (Feb. 25-Mar. 1, 2019).

"Deterministic Delay QoS Class for Time Synchronization Support of 3GPP Network," 3GPP TSG SA WG2 #129, Dongguan, China, S2-1811020, Total 8 pages, 3rd Generation Partnership Project, Valbonne, France (Oct. 15-19, 2018).

CMCC, "Scheduling Enhancements for TSN traffic," 3GPP TSG-RAN WG2 #104, Spokane, USA, R2-1818122, total 7 pages, 3rd Generation Partnership Project, Valbonne, France (Nov. 12-16, 2018).

Nokia, "[DRAFT] LS on assistance information for TSN traffic flows," 3GPP TSG-RAN WG2 Meeting #105, Athens, Greece, R2-1901714, total 1 pages, 3rd Generation Partnership Project, Valbonne, France (Feb. 25-Mar. 1, 2019).

"3rd Generation Partnership Project; Technical Specification Group Services and System Aspects; System Architecture for the 5G System; Stage 2 (Release 16)," 3GPP TS 23.501 V16.0.0, total 318 pages, 3rd Generation Partnership Project, Valbonne, France (Mar. 2019).

Nokia, Nokia Shanghai Bell, "TSN—QoS," SA WG2 Meeting #130, Kochi, India, S2-1900559, total 4 pages, 3rd Generation Partnership Project, Valbonne, France (Jan. 21-25, 2019).

CMCC, "Enhancement for Time-Sensitive Networking," 3GPP TSG-RAN WG2 Meeting #103bis, Chengdu, China, R2-1815270, total 10 pages, 3rd Generation Partnership Project, Valbonne, France (Oct. 8-12, 2018).

"3rd Generation Partnership Project; Technical Specification Group Radio Access Network; NG-RAN; Xn application protocol (XnAP)(Release 15)," 3GPP TS 38.423 V15.2.0, total 281 pages, 3rd Generation Partnership Project, Valbonne, France (Dec. 2018).

Ericsson, "TSN QoS and traffic scheduling in 5GS," 3GPP TSG-SA WG2 Meeting #130, Kochi, India, S2-1900609, total 9 pages, 3rd Generation Partnership Project, Valbonne, France (Jan. 21-25, 2019).

"3rd Generation Partnership Project; Technical Specification Group Radio Access Network; NG-RAN;NG Application Protocol (NGAP)(Release 15)," 3GPP TS 38.413 V15.2.0, total 308 pages, 3rd Generation Partnership Project, Valbonne, France (Dec. 2018).

Huawei, HiSilicon, "System enhancement for TSN logical bridge management," 3GPP TSG-SA WG2 Meeting #130, Kochi, India, S2-1900501, total 12 pages, 3rd Generation Partnership Project, Valbonne, France (Jan. 21-25, 2019).

Ericsson, "TSN QoS and traffic scheduling in 5GS," 3GPP TSG-SA WG2 Meeting #130, Kochi, India, S2-1901150, total 9 pages, 3rd Generation Partnership Project, Valbonne, France (Jan. 21-25, 2019).

Ericsson, "Additional TSN traffic pattern for RAN optimization," 3GPP TSG-SA WG2 Meeting #130, Kochi, India, S2-1901234, total 6 pages, 3rd Generation Partnership Project, Valbonne, France (Jan. 21-25, 2019).

Cisco, "Time-Sensitive Networking: A Technical Introduction," White Paper, total 8 pages (2017).

RU/2021130991, Notice of Allowance and Search Report, dated Jun. 1, 2023.

* cited by examiner

COMMUNICATION METHOD AND COMMUNICATIONS APPARATUS

CROSS-REFERENCE TO RELATED APPLICATIONS

This application is a continuation of International Application No. PCT/CN2020/079935, filed on Mar. 18, 2020, which claims priority to Chinese Patent Application No. 201910252336.X, filed on Mar. 29, 2019. The disclosures of the aforementioned applications are hereby incorporated by reference in their entireties.

TECHNICAL FIELD

This application relates to the field of mobile communications technologies, and in particular, to a communication method and a communications apparatus.

BACKGROUND

Time sensitive networking (TSN) is real-time and deterministic, can ensure reliability of service data transmission, and can also predict an end-to-end transmission delay in a data transmission process. With these advantages, TSN is widely applied to delay-sensitive technical fields, for example, industrial internet of things (IIoT).

Currently, to implement end-to-end reliable transmission of a TSN network through a 5th generation (5G) mobile communications network, it is proposed that the 5G network and the TSN network be converged, and the 5G network be virtualized into a switching node on the TSN network. In this way, when data packets of the TSN network arrive at the 5G network, a base station on the 5G network needs to allocate radio resources for the data packets. Because a clock used by the 5G network is inconsistent with a clock used by the TSN network, the base station cannot accurately know a time point at which the data packets of the TSN network arrive at the 5G network. Consequently, the base station cannot allocate resources to these data packets.

SUMMARY

This application provides a communication method and a communications apparatus, to allocate, by a base station, a radio resource to a data packet of a TSN network in a scenario in which the TSN network transmits the data packet through a 5G network.

According to a first aspect, an embodiment of this application provides a communication method. In the method, an access network device obtains a first traffic pattern, and allocates a radio resource to a first traffic based on the first traffic pattern.

According to a second aspect, an embodiment of this application provides a communication method. In the method, a terminal obtains a second traffic pattern, and generates a first traffic pattern based on the second traffic pattern and a first relationship. The terminal sends the first traffic pattern to an access network device. Further, the access network device may allocate a radio resource to a first traffic based on the first traffic pattern.

According to a third aspect, an embodiment of this application provides a communication method. In the method, a core network device sends a second traffic pattern to an access network device, and sends a first relationship to the access network device. After receiving the second traffic pattern and the first relationship, the access network device may determine a first traffic pattern based on the second traffic pattern and the first relationship. Further, the access network device may allocate a radio resource to a first traffic based on the first traffic pattern. The embodiment of this application provides another communication method. In the method, the core network device obtains the second traffic pattern, and generates the first traffic pattern based on the second traffic pattern and the first relationship. The core network device sends the first traffic pattern to the access network device. Further, the access network device may allocate the radio resource to the first traffic based on the first traffic pattern.

In this embodiment of this application, the first traffic pattern includes time information of the first traffic with respect to a first clock, and the first clock is a clock used by a first network. The second traffic pattern includes time information of the first traffic with respect to a second clock, and the second clock is a clock used by a second network. The time information includes a time point and/or a period at/in which a data packet of the first traffic arrives at the first network, and the first relationship is a relationship between the first clock and the second clock.

In embodiments of this application, the access network device, the terminal, and the core network device may be devices on the first network.

According to a fourth aspect, this application provides a communications apparatus configured to perform the steps in the first aspect, the second aspect, or the third aspect.

According to a fifth aspect, this application provides a communications apparatus, including at least one processor and a memory. The at least one processor is configured to perform the method provided in the first aspect, the second aspect, or the third aspect.

According to a sixth aspect, this application provides a communications apparatus, including at least one processor and an interface circuit. The at least one processor is configured to perform the method provided in the first aspect, the second aspect, or the third aspect.

According to a seventh aspect, this application provides a communication program. When being executed by a processor, the program is used to perform the method according to the first aspect, the second aspect, or the third aspect.

According to an eighth aspect, a program product is provided, for example, a computer-readable storage medium, including the program according to the seventh aspect.

In the foregoing aspects, the access network device may learn, based on time information of the first traffic, a time point at which each data packet of the first traffic arrives at the first network. Further, the access network device allocates radio resources to the traffic based on the time point at which each data packet arrives at the first network, so that the radio resources are more properly allocated. In addition, the time information that is of the first traffic and that is obtained by the access network device is the time information with respect to the first clock used by the first network, and the access network device belongs to the first network. Therefore, the access network device also uses the first clock. This can resolve a problem that resource allocation is inaccurate because a clock used by the access network device is different from a clock used by the time information of the first traffic.

In an exemplary embodiment, the access network device may obtain the first traffic pattern in the following manners.

Manner 1: The access network device receives the first traffic pattern from the core network device.

Manner 2: The access network device receives the first traffic pattern from the terminal.

Manner 3: The access network device receives the first traffic pattern from another access network device.

Manner 4: The access network device generates the first traffic pattern based on the second traffic pattern and the first relationship, where the first relationship is a relationship between the first clock and the second clock.

Based on Manner 4, in an exemplary embodiment, before generating the first traffic pattern based on the second traffic pattern and the first relationship, the access network device may obtain the second traffic pattern in the following manners.

Manner 1: The access network device receives the second traffic pattern from the core network device.

Manner 2: The access network device receives the second traffic pattern from the terminal.

Manner 3: The access network device receives the second traffic pattern from a centralized network configuration network element, where the centralized network configuration network element belongs to the second network.

Based on Manner 4, in an exemplary embodiment, before generating the first traffic pattern based on the second traffic pattern and the first relationship, the access network device may obtain the first relationship in the following manners.

Manner A: The access network device receives the first relationship from the core network device.

Manner B: The access network device obtains the first relationship locally.

In an exemplary embodiment, that the access network device obtains the first relationship locally includes: The access network device determines the first relationship based on the second clock and the first clock.

In an exemplary embodiment, the access network device may periodically receive the first relationship from the core network device.

In an exemplary embodiment, the access network device may further send the first traffic pattern to a target access network device.

In an exemplary embodiment, the access network device may further receive a pre-allocated radio resource from the target access network device, and may further send the pre-allocated radio resource to the terminal after receiving the pre-allocated radio resource.

In an exemplary embodiment, the terminal may receive the second traffic pattern from the centralized network configuration network element, and the centralized network configuration network element belongs to the second network.

In an exemplary embodiment, the terminal may determine the first relationship based on the second clock and the first clock. Alternatively, the terminal may receive the first relationship from an adaptation function entity. The adaptation function entity is configured to adapt the first network and the second network.

In an exemplary embodiment, the core network device may periodically send the first relationship to the access network device. Alternatively, the core network device periodically determines the first relationship, and sends the first relationship to the access network device when the first relationship meets a first condition.

Optionally, the first condition may be that a change value of the first relationship exceeds a threshold, or the first condition may be that a time interval in which the first relationship is sent reaches a threshold. The threshold in this application may be an empirical value, and is not limited.

In an exemplary embodiment, the core network device may receive the second traffic pattern from the centralized network configuration network element, and the centralized network configuration network element belongs to the second network.

In an exemplary embodiment, the core network device may determine the first relationship based on the second clock and the first clock.

DESCRIPTION OF EMBODIMENTS

Figure 1:
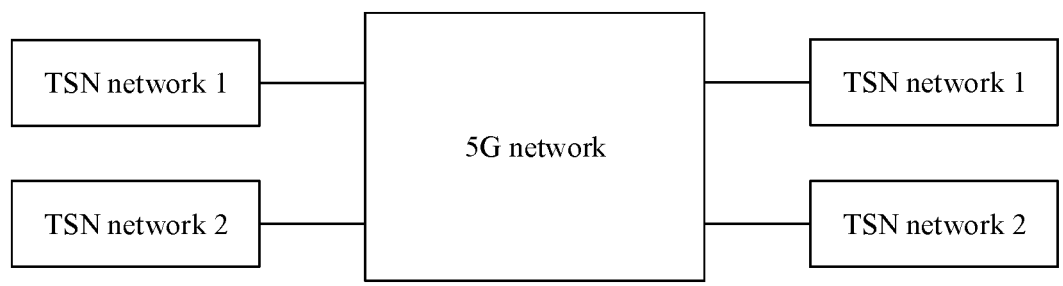
FIG. 1 is a schematic diagram of a network architecture according to an embodiment of this application.

Some terms in this application are first described, to help a person skilled in the art have a better understanding.

(1) A terminal is also referred to as user equipment (UE), a mobile station (MS), a mobile terminal (MT), or the like, and is a device that provides voice and/or data connectivity for a user, for example, a handheld device or a vehicle-mounted device that has a wireless connection function. Currently, examples of some terminals are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(2) An access network device is a radio access network (RAN) node (or device) that connects a terminal to a wireless network, and may also be referred to as a base station. Currently, examples of some RAN nodes are: a further evolved NodeB (gNB), a transmission reception point (TRP), an evolved NodeB (evolved Node B, eNB), a radio network controller (RNC), a NodeB (Node B, NB), a base station controller (BSC), a base transceiver station (BTS), a home eNodeB (for example, a home evolved NodeB or a home Node B, HNB), a baseband unit (base band unit, BBU), a wireless fidelity (Wifi) access point (AP), and the like. In addition, in a network structure, the access network device may include a centralized unit (CU) node, a distributed unit (DU) node, or a RAN device including a CU node and a DU node. The RAN device including a CU node and a DU node splits protocol layers of an eNB in a long term evolution (LTE) system. Functions of some protocol layers are centrally controlled by the CU, functions of some or all of remaining protocol layers are distributed in the DU, and the CU centrally controls the DU.

(3) A core network device is a device on a core network (CN) that provides service support for a terminal. Currently, examples of some core network devices are: an access and mobility management function (AMF) entity, a session management function (SMF) entity, a user plane function (UPF) entity, and the like, which are not listed one by one herein. The AMF entity may be responsible for access management and mobility management of the terminal. The SMF entity may be responsible for session management, for example, establishment of user sessions, and the like. The UPF entity may be a function entity on a user plane, and is mainly responsible for a connection to an external network. It should be noted that an entity in this application may also be referred to as a network element or a function entity. For example, the AMF entity may also be referred to as an AMF network element or an AMF function entity. For another example, the SMF entity may also be referred to as an SMF network element or an SMF function entity.

(4) The following describes two uplink resource allocation manners. One manner is dynamic scheduling. Each time a network device schedules an uplink dynamic grant (DG), the network device indicates information such as a time-frequency position of a scheduled uplink transmission resource through downlink control information (DCI). For example, a base station may use the DCI to notify a terminal to receive data (downlink) in a frequency band YYY at a time point XXX, and to send data (uplink) in a frequency band VVV at a time point ZZZ. A resource allocated by the base station based on the dynamic scheduling is valid for one time, that is, a resource allocated by the base station to the terminal by using the DG can be used only for one time. Another manner is a configured grant (CG), which may also be referred to as static/semi-static scheduling. Currently, two types of configured grants are defined: a configured grant type 1 and a configured grant type 2. A resource allocated by the base station based on the configured grant is valid for a plurality of times. For example, it is assumed that the base station notifies, through a control channel (radio resource control (RRC) signaling, medium access control (MAC) signaling, or physical layer signaling), the terminal to: receive data in a frequency band YYY at a time point XXX, and then receive data (downlink) in the frequency band YYY at the time point XXX every period T1; and send data in a frequency band VVV at a time point ZZZ, and then send data (uplink) in the frequency band VVV at the time point ZZZ every period T2.

Based on the foregoing two uplink resource scheduling manners, scheduled uplink resources may be classified into two types. An uplink resource scheduled in a dynamic scheduling manner is referred to as a DG resource, a DG type resource, or DG. An uplink resource scheduled in a configured grant manner is referred to as a CG resource, a CG type resource, or CG. Names of the uplink resources are not limited in this application.

When allocating a radio resource to the terminal by using the configured grant type 1, the base station configures parameters such as a time-frequency resource location of the configured grant type 1, a period of a CG resource, a quantity of hybrid automatic repeat request (HARQ) processes that use the CG resource, and a modulation and coding scheme (MCS). The network device provides the parameters for the terminal through RRC signaling. After receiving the RRC signaling, the terminal stores the parameters as a configured uplink grant, so that the terminal may transmit uplink data by using the configured grant.

When allocating a radio resource to the terminal by using the configured grant type 2, the base station configures parameters such as a period of a CG resource of the configured grant type 2 and a quantity of HARQ processes that use the CG resource. The network device provides the parameters for the terminal through RRC signaling. Parameters such as a time-frequency resource location of the configured grant type 2, and an MCS are provided by the network device for the terminal through the DCI, and are stored by the terminal as a configured uplink grant. That is, the configured grant type 2 may be activated or deactivated by physical layer (PHY) signaling or layer 1 (L1) signaling. When the network device activates the configured grant type 2 through the DCI, the time-frequency resource location is provided by the network device for the terminal through the DCI, and is stored by the terminal as a configured uplink grant, so that the terminal may transmit uplink data by using the configured grant.

(5) A clock used by a 5G network is a same clock used by all devices/network elements on the 5G network, to support on-time data transmission on the 5G network. In this application, the same clock is referred to as the clock used by the 5G network, a 5G network clock, or a 5G clock. Correspondingly, in embodiments of this application, a 5G time point is a time point with respect to the 5G clock, or may be understood as a time point described by the 5G clock. Correspondingly, a clock used by a TSN network is a same clock used by all devices/network elements on the TSN network, to support on-time data transmission on the TSN network. In this application, the same clock is referred to as the clock used by the TSN network, a TSN network clock, or a TSN clock. Usually, each network uses its own clock, and clocks used by networks are different. For example, the clock used by the 5G network is different from the clock used by the TSN network, and different TSN networks use different clocks. Referring to FIG. 1, FIG. 1 includes three types of networks: a 5G network, a TSN network 1, and a TSN network 2. The TSN network 1 and the TSN network 2 are different TSN networks. Each type of network uses an independent clock. In FIG. 1, both the TSN network 1 and the TSN network 2 may transmit data through the 5G network.

It should be noted that the terms "network" and "system" are usually interchangeably used, but a person skilled in the art can understand meanings of the terms.

(6) "A plurality of" means two or more, and another quantifier is similar to this. The term "and/or" describes an association relationship for describing associated objects and indicate that three relationships may exist. For example, A and/or B may indicate the following three cases: Only A exists, both A and B exist, and only B exists. In addition, unless otherwise specified in the context, an element that appears in singular forms "a", "an", and "the" does not mean "one or only one", but means "one or more". For example, "a device" means one or more such devices. Further, "at least one . . . " means one or any combination of subsequent associated objects. For example, "at least one of A, B, and C" includes A, B, C, A and B, A and C, B and C, or A, B, and C.

It should be noted that, in descriptions of this application, words such as "first" and "second" are merely used for distinction and description, and shall not be understood as an indication or implication of relative importance or an indication or implication of an order.

This application provides a communication method and a communications apparatus, to enable a base station to allocate a radio resource to a data packet on the TSN. The following further describes the technical solutions of this application in detail with reference to the accompanying drawings of this specification.

Figure 2:
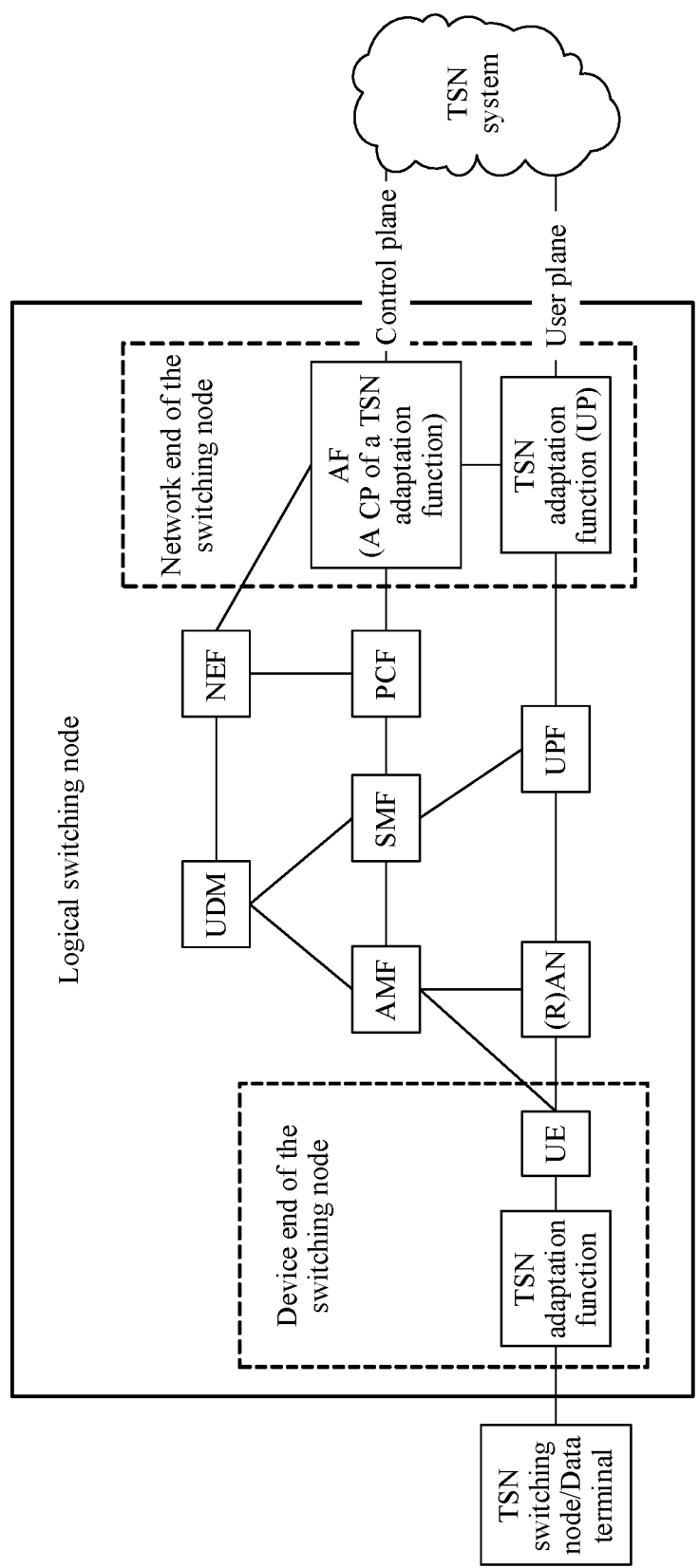
FIG. 2 is a schematic diagram of a network architecture to which an embodiment of this application is applicable.

FIG. 2 is a schematic diagram of a network architecture to which an embodiment of this application is applicable. FIG. 2 shows a network architecture in which a 5th generation (5th-generation, 5G) mobile communications network and a TSN network are converged. In the network architecture, the 5G network is virtualized into a logical switching node (which may also be referred to as a virtual switching node) on the TSN network. A device/network element on the TSN network, for example, a TSN switching node/data terminal and a TSN system in FIG. 2, may perform data transmission through the logical switching node. As shown in FIG. 2, to well integrate the 5G network into the TSN network, an adaptation function on a network side and an adaptation function on a terminal side are added between the TSN network and the 5G network. In FIG. 2, an example is used for description: A control plane (CP) of a TSN adaptation function on the network side is added to an application function (AF) network element; a user plane (UP) of the TSN adaptation function on the network side is added to a user plane function (UPF) network element; and a TSN adaptation function on the terminal side is added to user equipment (UE). The control plane of the TSN adaptation function on the network side, the user plane of the TSN adaptation function on the network side, the TSN adaptation function on the terminal side, and the 5G network together form the logical switching node, to be used as a switching node on TSN. Although in FIG. 2, a UPF network element and the UP of the TSN adaptation function on the network side are drawn separately, and the UE and the TSN adaptation function on the terminal side are drawn separately, in practice, the UP of the TSN adaptation function on the network side may be deployed on the UPF network element, or the UP of the TSN adaptation function on the network side may be an internal function module of the UPF network element. Correspondingly, the TSN adaptation function on the terminal side may be deployed on the UE, or the TSN adaptation function on the terminal side may be an internal function module of the UE. The CP of the TSN adaptation function on the network side, the UP of the TSN adaptation function on the network side, and the TSN adaptation function on the terminal side are used to adapt characteristics and information of the 5G network to information required by the TSN, and communicate with a network element on the TSN through an interface defined by the TSN. Based on the network architecture shown in FIG. 2, in a process in which the TSN network transmits data through the 5G network, a downlink transmission path of the data may be: the TSN system->the TSN adaptation function on the network side (UP)->the UPF->a RAN->the UE->the TSN adaptation function on the terminal side->the TSN switching node/data terminal; and an uplink transmission path of the data may be: the TSN switching node/data terminal->the TSN adaptation function on the terminal side->the UE->the RAN->the UPF->the TSN adaptation function on the network side (UP)->the TSN system.

It may be understood that, in FIG. 2, in the network architecture in which the 5G network and the TSN network are converged, the TSN switching node/data terminal and the TSN system belong to the TSN network, and all nodes except the TSN switching node/data terminal and the TSN system belong to the 5G network.

It should be noted that the network architecture in FIG. 2 is described by an example in which the 5G network and the TSN network are converged. The 5G network in FIG. 2 may alternatively be replaced with another 3rd generation partnership project (3rd Generation Partnership Project, 3GPP) network, for example, may be replaced with a 4.5G network, a 4G network, a 3G network, a 2G network, a future 6G network, or the like. A method provided in embodiments of this application may be applicable to a network architecture in which any 3GPP network and the TSN network are converged. A method provided in embodiments of this application is not limited to the network architecture shown in FIG. 2.

The following briefly describes functions of network elements in the network architecture shown in FIG. 2.

For the UE, refer to the foregoing explanation (1).

For the RAN, refer to the foregoing explanation (2).

The UPF network element is a functional network element on a user plane, and is mainly responsible for a connection to an external network. The UPF network element includes related functions of an LTE serving gateway (SGW) and a public data network gateway (public data network GateWay, PDN-GW), and is mainly responsible for data packet forwarding, charging information statistics, and the like.

An AMF network element is responsible for access management and mobility management of a terminal. In an actual application, the AMF network element includes a mobility management function of a mobility management entity (mobile management entity, MME) on an LTE network, and further includes an access management function.

An SMF network element is responsible for session management, for example, establishment of sessions of a terminal (UE).

A unified data management (UDM) network element is configured to manage subscription information of a user, and is similar to a backend of a home subscriber server (HSS) in LTE in implementation.

A main function of a policy control function (PCF) network element is policy control execution. Similar to a policy and charging rules function (PCRF) network element in LTE, the PCF network element is mainly responsible for policy authorization, quality of service, and charging rule generation, and delivers a corresponding rule to the UPF network element through the SMF network element, to complete installation of a corresponding policy and the corresponding rule.

A network exposure function (NEF) network element is configured to: provide a framework, authentication, and an interface that are related to network capability exposure, and transfer information between a 5G system network function and another network function.

The AF network element may be an application control platform of a third party, or may be a device of an operator. The AF network element may provide services for a plurality of application servers. The AF network element is a function network element that can provide various business services, can interact with a core network through the NEF network element, and can interact with a policy management framework to perform policy management.

The logical switching node (namely, a node virtualized from the 5G network) is mainly configured to perform data or packet forwarding.

The TSN switching node is mainly configured to perform data or packet forwarding. The TSN switching node may further have another function, for example, a topology discovery function, that is, determining an identifier of a switch and an identifier of a switch port, and supporting a protocol such as a link layer discovery protocol (link layer discovery protocol, LLDP). For another example, the TSN switching node may determine a transmission delay, and after detecting an internal transmission delay of the switching node, report the detected transmission delay to a configuration network element.

It should be noted that FIG. 2 does not describe the TSN system in detail. In an actual application, the TSN system may include the configuration network element, configured to implement TSN configuration. For example, the TSN system may include a centralized network configuration (CNC) network element and a centralized user configuration (CUC) network element.

Figure 3:
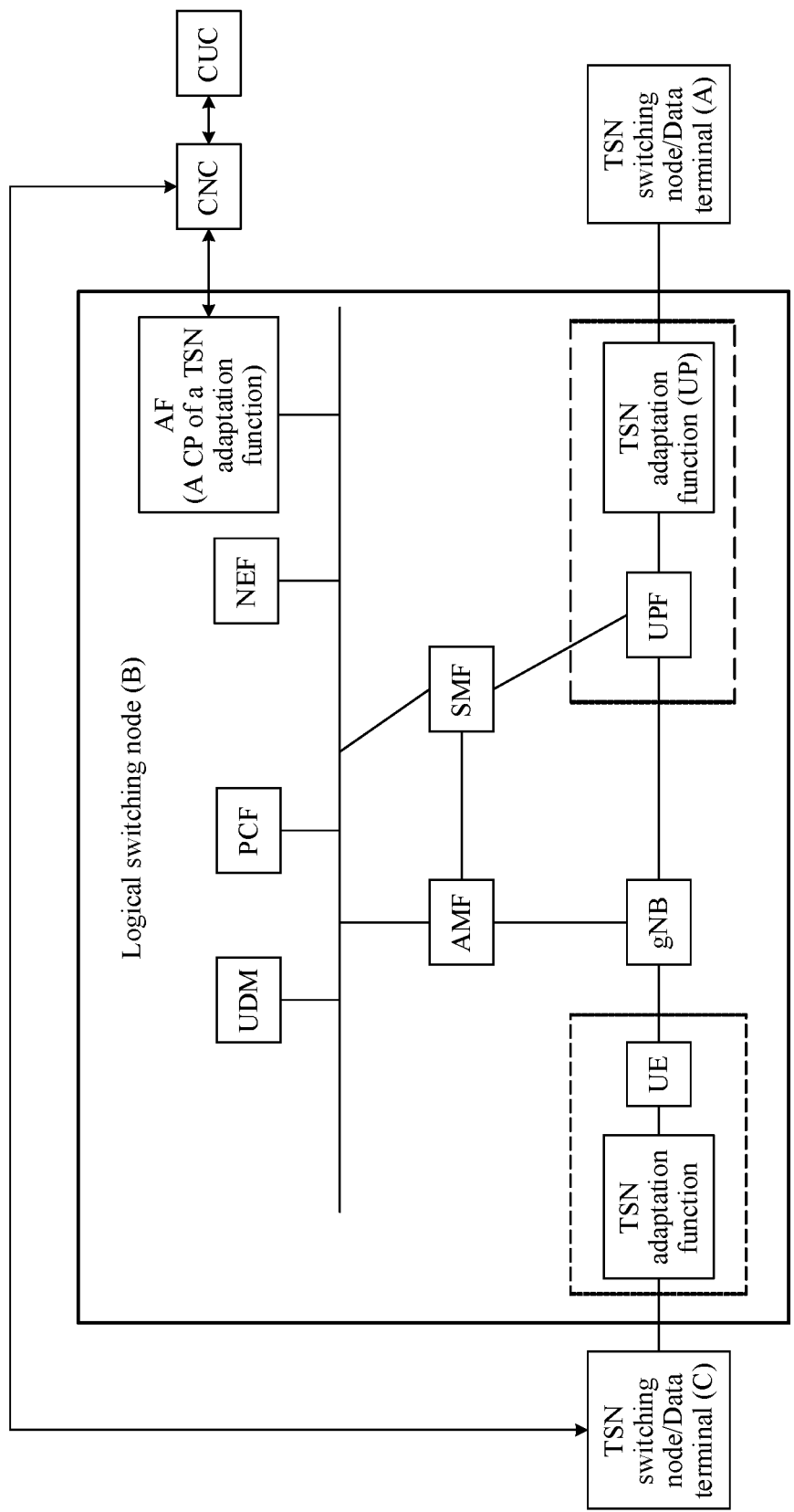
FIG. 3 is a schematic diagram of another network architecture to which an embodiment of this application is applicable.

FIG. 3 is a schematic diagram of another network architecture to which an embodiment of this application is applicable. FIG. 3 shows another network architecture in which a 5G network and a TSN network are converged. The network architecture includes three TSN nodes: a TSN switching node/data terminal A, a logical switching node B (a TSN switching node virtualized from a 5G system), and a TSN switching node/data terminal C. The TSN network in the network architecture includes a CNC network element, a CUC network element, and a TSN switching node/data terminal. Network elements included on the 5G network in the network architecture are basically the same as the network elements included on the 5G network in FIG. 2. A difference is that an example in which a RAN is a gNB is used in FIG. 3. It should be noted that FIG. 3 shows only an example in which a TSN network architecture includes the three TSN nodes. In an actual application, the TSN network architecture may include more than three or less than three TSN nodes.

The following briefly describes functions of network elements in the network architecture shown in FIG. 3.

The CNC network element is responsible for managing a topology of a TSN user plane and information of a switching node, generating a transmission path of a TSN flow and processing policies on a data terminal and each switching node based on a flow creation request provided by the CUC network element, and delivering a processing policy on the switching node to a corresponding switching node.

The CUC network element is configured to obtain a TSN capability of the data terminal, that is, obtain a quantity of ports of the data terminal, a media access control (medium access control, MAC) address of each port, an 802.1 capability supported by each port, and the like. On this basis, the CUC network element may collect a flow creation request of the data terminal, after performing a flow matching on a flow creation request of a transmitting end and a flow creation request of a receiving end, request the CNC network element to create the TSN flow, and confirm a processing policy generated by the CNC network element. The performing matching on a flow creation request of a transmitting end and a flow creation request of a receiving end means the following: The transmitting end and the receiving end each send the flow creation request to the CUC network element, where the flow creation request includes some information, for example, a destination MAC address of a requested TSN flow. The CUC network element performs matching on the flow creation request and a destination MAC address of a TSN flow requested by a different data terminal. If destination MAC addresses of TSN flows requested by two data terminals are the same, the TSN flows requested by the two data terminals are the same. In other words, the matching succeeds, and the TSN flow can be created. Otherwise, the TSN flow cannot be created with only the flow creation request of the transmitting end or the flow creation request of the receiving end.

It may be understood that the CNC network element and the CUC network element are control plane network elements on the TSN. An AF network element is used as a connection node between the 5G network and the TSN network, and the AF network element may interact with the CNC network element on the TSN.

For functions of nodes included in the 5G system in FIG. 3, refer to related descriptions in FIG. 2. No repeated description is provided again.

For example, the network architecture shown in FIG. 2 is applied to industrial internet of things. When a data packet of an industrial internet of things service arrives at the 5G network from the TSN system (downlink transmission), a RAN on the 5G network needs to allocate, to the data packet, a radio resource used for the downlink transmission. Alternatively, when a data packet of the industrial internet of things service arrives at the 5G network from the TSN switching node/data terminal (uplink transmission), the RAN on the 5G network needs to allocate, to the data packet, a radio resource used for the uplink transmission.

For example, the network architecture shown in FIG. 3 is applied to industrial internet of things. When a data packet of an industrial internet of things service arrives at the 5G network from the TSN switching node/data terminal (A) (downlink transmission), a gNB on the 5G network needs to allocate, to the data packet, a radio resource used for the downlink transmission. Alternatively, when a data packet of the industrial internet of things service arrives at the 5G network from the TSN switching node/data terminal (C) (uplink transmission), the gNB on the 5G network needs to allocate, to the data packet, a radio resource used for the uplink transmission.

The data packet of the industrial internet of things service is generated in a deterministic manner, that is, one data packet or a group of data packets are generated at a fixed time interval. In other words, a time point at which the data packet of the industrial internet of things service is generated and a period in which the data packet of the industrial internet of things service is generated may be predetermined. Therefore, a RAN/gNB may allocate a CG (CG) resource to the industrial internet of things service in a configured grant CG resource allocation manner. To assist the RAN/gNB in allocating the CG resource to the industrial internet of things service, the following solution may be considered: The TSN network sends, to the 5G network, a downlink traffic pattern or an uplink traffic pattern. For downlink transmission, the downlink traffic pattern may include time information of a data packet of the industrial internet of things service. For example, the time information may include a time point at which the data packet arrives at a UPF network element on the 5G network and a period in which the data packet arrives at the UPF network element on the 5G network. For uplink transmission, the uplink traffic pattern may include time information of a data packet of the industrial internet of things service. For example, the time information may include a time point at which the data packet arrives at UE on the 5G network and a period in which the data packet arrives at the UE on the 5G network. Because the TSN network uses a TSN clock, the downlink traffic pattern or the uplink traffic pattern sent by the TSN network to the 5G network is a downlink traffic pattern or an uplink traffic pattern with respect to the TSN clock. A clock used by the 5G network is different from the clock used by the TSN network. Therefore, the RAN/gNB on the 5G network cannot use the downlink traffic pattern or the uplink traffic pattern that is with respect to the TSN clock and that is sent by the TSN network to the 5G network. As a result, the RAN/gNB cannot accurately know time points at which data packets of the industrial internet of things service arrive at the 5G network. Consequently, the RAN/gNB cannot allocate resources to the data packets.

Based on the foregoing existing problem, an embodiment of this application provides a communication method. According to the method, an access network device on a 5G network may obtain a traffic pattern with respect to a 5G clock, and may determine, based on the traffic pattern with respect to the 5G clock, time points at which data packets on a TSN network arrive at the 5G network. Further, the access network device may allocate radio resources to the data packets on the TSN network based on an arrival time point of each data packet, so that the allocated radio resources are more accurate.

Figure 4:
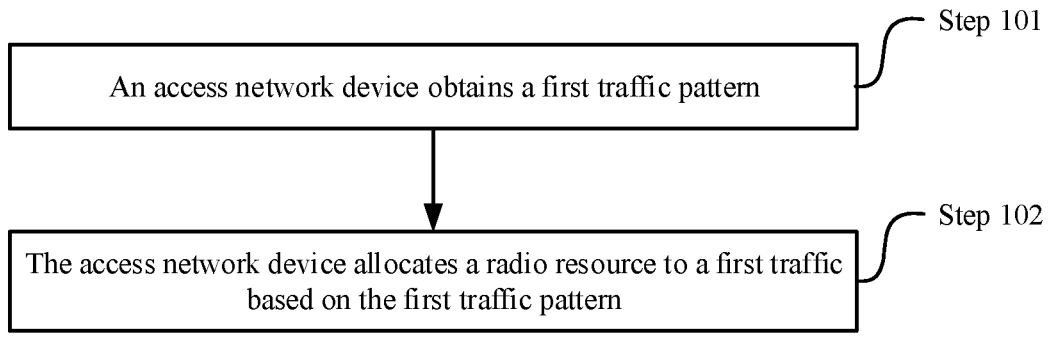
FIG. 4 is a flowchart of a communication method according to an embodiment of this application.

FIG. 4 shows a communication method according to an embodiment of this application. The method may be applied to the network architecture shown in FIG. 2 or FIG. 3. When the method is applied to the network architecture shown in FIG. 2, an access network device used in the method may be the RAN in FIG. 2, a core network device used in the method may be the UPF in FIG. 2, and a terminal used in the method may be the UE in FIG. 2. When the method is applied to the network architecture shown in FIG. 3, an access network device used in the method may be the gNB in FIG. 3, a core network device used in the method may be the UPF in FIG. 3, and a terminal used in the method may be the UE in FIG. 3. The method provided in this application is not limited to being applied to the network architecture shown in FIG. 2 or FIG. 3, and may also be applied to another network architecture. Referring to FIG. 4, the communication method may include the following processing procedure.

Step 101: The access network device obtains a first traffic pattern.

In this embodiment of this application, the first traffic pattern includes time information of a first traffic with respect to a first clock. The first clock is a clock used by a first network. The access network device belongs to the first network. The time information includes time points and/or periods at/in which data packets of the first traffic arrive at the first network.

The time points at which the data packets of the first traffic arrive at the first network may include a time point at which a first data packet of the first traffic arrives at the first network. The time information of the first traffic with respect to the first clock may be understood as time information that is of the first traffic and that is described by the first clock, or may be understood as time information of the first traffic that uses the first clock. That the access network device belongs to the first network may be understood as that the access network device is an access network device on the first network.

It should be noted that meanings of the first traffic pattern, the first clock, the first network, and the time information related in the following descriptions of this application are the same as meanings of the first traffic pattern, the first clock, the first network, and the time information herein. Details are not described again when the first traffic pattern, the first clock, the first network, and the time information appear again.

It may be understood that, if the method in FIG. 4 is applied to the field of IIoT technologies, the first traffic in this application may be an IIoT service.

In this embodiment of this application, the first network may be a 3GPP network such as a 5G network, a 4.5G network, a 4G network, a 3G network, a 2G network, or a future wireless communications network. For example, when the first network is the 5G network, the first clock is a clock used by the 5G network or is described as a 5G network clock. For another example, when the first network is the 4.5G network, the first clock is a clock used by the 4.5G network or is described as a 4.5G network clock. For another example, when the first network is the future wireless communications network, for example, a 6G network, the first clock is a clock used by the 6G network or is described as a 6G network clock.

In this embodiment of this application, an example is used for description: The first network is the 5G network, the first clock is the clock used by the 5G network, and the access network device is an access network device on the 5G network.

In this embodiment of this application, the time information of the first traffic with respect to the first clock may be corresponding to the following three cases.

In a first case, the time information of the first traffic with respect to the first clock may include the time points at which the data packets of the first traffic arrive at the first network and the periods in which the data packets of the first traffic arrive at the first network. A first implementation is applicable to a first traffic of any type.

In a second case, the time information of the first traffic with respect to the first clock may include the time points at which the data packets of the first traffic arrive at the first network. The second case may be applicable to a first traffic including a relatively small quantity of data packets. For example, it is assumed that the first traffic includes one, two, three, or a limited quantity of data packets. Time information of the first traffic with respect to the first clock may include only time points at which the data packets of the first traffic arrive at the first network, and does not include periods in which the data packets of the first traffic arrive at the first network. Alternatively, the second case may also be applicable to a first traffic including a burst data packet.

In a third case, the time information of the first traffic with respect to the first clock may include the periods in which the data packets of the first traffic arrive at the first network. The third case may be applicable to a first traffic that generates a first data packet at a fixed time point. For example, it is assumed that the first data packet of the first traffic is generated at a fixed time point A. Time information of the first traffic with respect to the first clock may include only a period in which the data packet arrives at the first network. Because a time point at which the first data packet of the first traffic arrives at the first network is fixed, the access network device may determine, based on the time point at which the first data packet of the first traffic arrives at the first network and the period in which the first data packet arrives at the first network, time points at which all data packets included in the first traffic arrive at the first network.

In this embodiment of this application, when the first traffic is an uplink traffic or a downlink traffic, there are different understandings for that a data packet arrives at the first network.

For example, when the first traffic is the downlink traffic, correspondingly, the first traffic pattern may be understood as a downlink traffic pattern. In this case, that a data packet arrives at the first network may include that the data packet arrives at a core network device on the first network, for example, the data packet arrives at a UPF network element on the first network. Alternatively, in this case, that a data packet arrives at the first network may include that the data packet arrives at the access network device on the first network, for example, the data packet arrives at a gNB/RAN of the first network.

For example, when the first traffic is the uplink traffic, correspondingly, the first traffic pattern may be understood as an uplink traffic pattern. In this case, that a data packet arrives at the first network may include that the data packet arrives at a terminal on the first network. That the data packet arrives at a terminal on the first network may include that the data packet arrives at an application layer of the terminal on the first network or that the data packet arrives at an access layer of the terminal on the first network.

In this embodiment of this application, how the access network device obtains the first traffic pattern is not limited. The following provides four possible implementations.

Implementation 1: The access network device receives the first traffic pattern from the core network device. For example, the access network device may receive the first traffic pattern from the UPF network element. The core network device may be a core network device that belongs to a same network as the access network device, for example, both the core network device and the access network device belong to the first network. It should be noted that the first traffic pattern obtained based on the implementation 1 may be the uplink traffic pattern or the downlink traffic pattern.

Based on the foregoing implementation 1, in a possible implementation, before sending the first traffic pattern to the access network device, the core network device may obtain a second traffic pattern, and generate the first traffic pattern based on the second traffic pattern and a first relationship.

In this embodiment of this application, the second traffic pattern includes time information of the first traffic with respect to a second clock. The second clock is a clock used by a second network. The time information in the second traffic pattern includes time points and/or periods at/in which the data packets of the first traffic arrive at the core network device on the first network. In other words, the time points at which the data packets of the first traffic arrive at the first network and that are included in the time information in the first traffic pattern generated by the core network device based on the second traffic pattern and the first relationship are the time points at which the data packets of the first traffic arrive at the core network device on the first network.

In this embodiment of this application, the time information of the first traffic with respect to the second clock may be understood as time information that is of the first traffic and that is described by the second clock, or may be understood as time information of the first traffic that uses the second clock. In this embodiment of this application, the first relationship is a relationship between the first clock and the second clock. For example, the first relationship may indicate a difference between the first clock and the second clock. The first relationship may be that the first clock is X seconds faster than the second clock, or the first relationship may be that the first clock is Y seconds slower than the second clock. It should be noted that meanings of the second traffic pattern, the second clock, or the first relationship related in the following are the same as meanings of the second traffic pattern, the second clock, or the first relationship described herein. Details are not described again when the second traffic pattern, the second clock, or the first relationship appears again.

Based on the foregoing implementation 1, in another possible implementation, before sending the first traffic pattern to the access network device, the core network device may obtain a second traffic pattern, and generate the first traffic pattern based on the second traffic pattern, a first relationship, and a delay between a core network device and the access network device on the first network. In this implementation, the time points at which the data packets of the first traffic arrive at the first network and that are included in the time information in the generated first traffic pattern are time points at which the data packets of the first traffic arrive at the access network device on the first network.

In this embodiment of this application, the delay between the core network device and the access network device on the first network may be manually configured, or may be obtained through measurement by the core network device. This is not limited in this application.

In this embodiment of this application, the second network may include a TSN network or another delay-sensitive network. For example, when the second network is the TSN network, the second clock is a clock used by the TSN network or is described as a TSN network clock.

Based on the foregoing possible implementation, the core network device may obtain the second traffic pattern in the following manner: The core network device receives the second traffic pattern from a centralized network configuration network element, where the centralized network configuration network element belongs to the second network. For example, when the second network is the TSN network, the centralized network configuration network element may be a CNC network element. The network architecture shown in FIG. 3 is used as an example. It is assumed that the 5G network in FIG. 3 is the first network, the TSN network is the second network, the core network device is the UPF network element, and the centralized network configuration network element is the CNC network element. For example, the UPF network element may receive the second traffic pattern from the CNC network element through the following path: the CNC network element->the AF network element->an NEF network element->a PCF network element->an SMF network element->the UPF network element. In other words, the CNC network element in the TSN network may send the second traffic pattern to the UPF network element on the 5G network through the AF network element, the NEF network element, the PCF network element, and the SMF network element that are on the 5G network.

Based on the foregoing possible implementations, the first relationship may be determined by the core network device based on the second clock and the first clock.

Implementation 2: The access network device receives the first traffic pattern from the terminal. The terminal may be a terminal that belongs to a same network as the access network device. It should be noted that the first traffic pattern obtained based on the implementation 2 is the uplink traffic pattern.

Based on the foregoing implementation 2, in a possible implementation, before sending the first traffic pattern to the access network device, the terminal may obtain a second traffic pattern, and generate the first traffic pattern based on the second traffic pattern and a first relationship. In this implementation, the time points at which the data packets of the first traffic arrive at the first network and that are included in the time information in the generated first traffic pattern are time points at which the data packets of the first traffic arrive at the terminal.

Based on the foregoing possible implementation, the terminal may obtain the second traffic pattern in the following manner: The terminal receives the second traffic pattern from a centralized network configuration network element, where the centralized network configuration network element belongs to the second network. For example, when the second network is the TSN network, the centralized network configuration network element may be a CNC network element. The network architecture shown in FIG. 3 is used as an example. It is assumed that the 5G network in FIG. 3 is the first network, the TSN network is the second network, the terminal is the UE, and the centralized network configuration network element is the CNC network element. For example, the UE may receive the second traffic pattern from the CNC network element through the following path: the CNC network element->the UE. In other words, the CNC network element in the TSN network may directly send the second traffic pattern to the UE on the 5G network through an application layer message.

Based on the foregoing possible implementation, the first relationship may be determined by the terminal based on the second clock and the first clock, or the first relationship may be determined by an adaptation function entity on a terminal side based on the second clock and the first clock. The adaptation function entity is configured to adapt the first network and the second network. After determining the first relationship, the adaptation function entity on the terminal side may send the determined first relationship to the terminal. For example, the network architecture shown in FIG. 3 is used as an example. The adaptation function entity on the terminal side may be a TSN adaptation function in FIG. 3.

Implementation 3: The access network device receives the first traffic pattern from another access network device. In the third implementation, the access network device may be an access network device after a handover, and may be understood as a destination access network device. The another access network device may be an access network device before the handover, and may be understood as a source access network device. When the time point at which the data packets of the first traffic arrive at the first network and that are included in the time information in the first traffic pattern sent by the source access network device to the destination access network device are time points at which the data packets of the first traffic arrive at the source access network device. When the destination access network device receives the first traffic pattern, by default, the time points at which the data packets of the first traffic arrive at the first network and that are included in the time information in the first traffic pattern are time points at which the data packets of the first traffic arrive at the destination access network device. It should be noted that the first traffic pattern obtained based on the implementation 3 may be the uplink traffic pattern or the downlink traffic pattern.

Implementation 4: The access network device generates the first traffic pattern based on a second traffic pattern and a first relationship. Alternatively, the access network device generates the first traffic pattern based on the second traffic pattern, the first relationship, and a delay between the core network device and the access network device. It should be noted that the first traffic pattern obtained based on the implementation 4 may be the uplink traffic pattern or the downlink traffic pattern.

In the foregoing implementation 4, the second traffic pattern may be obtained by the access network device in the following manners.

Manner 1: The access network device receives the second traffic pattern from the core network device. For example, the access network device receives the second traffic pattern from the UPF network element.

Manner 2: The access network device receives the second traffic pattern from the terminal. For example, the access network device receives the second traffic pattern from the UE.

Manner 3: The access network device receives the second traffic pattern from a centralized network configuration network element, where the centralized network configuration network element belongs to the second network. For example, when the second network is the TSN network, the centralized network configuration network element may be a CNC network element. The network architecture shown in FIG. 3 is used as an example. It is assumed that the 5G network in FIG. 3 is the first network, the TSN network is the second network, the access network device is the gNB, and the centralized network configuration network element is the CNC network element. For example, the gNB may receive the second traffic pattern from the CNC network element through the following path: the CNC network element->the AF network element->an NEF network element->a PCF network element->an AMF network element->the gNB. In other words, the CNC network element in the TSN network may send the second traffic pattern to the gNB on the 5G network through the AF network element, the NEF network element, the PCF network element, and the AMF network element that are on the 5G network.

In the foregoing implementation 4, the first relationship may be obtained by the access network device in the following manners.

Manner A: The access network device receives the first relationship from the core network device.

Based on Manner A, the access network device may periodically receive the first relationship from the core network device.

Based on Manner A, the core network device may periodically determine the first relationship, and sends the first relationship to the access network device when the first relationship meets a first condition. For example, the first condition may be that a change value of the first relationship exceeds a threshold. The threshold may be manually set, and may be an empirical value. This is not limited in this application.

Manner B: The access network device obtains the first relationship locally.

Based on Manner B, the access network device determines the first relationship based on the second clock and the first clock.

For different manners in which the second traffic pattern and a second relationship are obtained, the foregoing implementation 4 may be corresponding to the following several implementations.

In a first implementation, based on a solution of a combination of Manner 1 and Manner A, the access network device receives the second traffic pattern and the first relationship from the core network device. The access network device generates the first traffic pattern based on the second traffic pattern, the first relationship, and the delay between the core network device and the access network device.

In a second implementation, based on a solution with a combination of Manner 1 and Manner A, the access network device receives the second traffic pattern from the core network device. The access network device periodically receives the first relationship from the core network device. The access network device may generate the first traffic pattern based on the second traffic pattern, the periodically updated first relationship, and the delay between the core network device and the access network device. Compared with the first implementation, in this implementation, the first relationship may be periodically updated, that is, the relationship between the first clock and the second clock may be periodically updated. In this way, accuracy of the first relationship can be ensured, and accuracy of the first traffic pattern determined based on the first relationship and the second traffic pattern can be further ensured.

In a third implementation, based on a solution with a combination of Manner 1 and Manner A, the access network device receives the second traffic pattern from the core network device. The access network device receives an initial first relationship from the core network device. Subsequently, when the change value of the first relationship exceeds the threshold, the core network device sends a changed first relationship to the access network device. Then, the access network device may generate the first traffic pattern based on the second traffic pattern, the updated first relationship, and the delay between the core network device and the access network device. Compared with the first implementation, in this implementation, the first relationship may be dynamically updated. In this way, accuracy of the first relationship can be ensured, and accuracy of the first traffic pattern determined based on the first relationship and the second traffic pattern can be further ensured. Compared with the second implementation, in this implementation, the first relationship does not need to be frequently updated, so that signaling overheads can be reduced.

In a fourth implementation, based on a solution with a combination of Manner 2 and Manner B, the access network device receives the second traffic pattern from the terminal, locally obtains the first relationship from the access network device, and further generates the first traffic pattern based on the second traffic pattern and the first relationship.

In a fifth implementation, based on a solution of a combination of Manner 3 and Manner B, the access network device receives the second traffic pattern from the centralized network configuration network element, and locally obtains the first relationship from the access network device. When the second traffic pattern is a downlink traffic pattern, the access network device may generate the first traffic pattern based on the second traffic pattern, the first relationship, and the delay between the access network device and the core network device. When the second traffic pattern is an uplink traffic pattern, the access network device may generate the first traffic pattern based on the second traffic pattern and the first relationship.

Based on the foregoing first, second, third, or fifth implementation, the delay between the core network device and the access network device may be manually configured, may be measured by the core network device and sent to the access network device, may be measured by the access network device, or may be an average value of delays measured by the access network device for a plurality of times. This is not limited in this application.

Certainly, in addition to the foregoing several possible implementations, there may be another combination implementation. For example, Manner 2 may be further combined with Manner A. Details are not listed one by one in this application.

Step 102: The access network device allocates a radio resource to a first traffic based on the first traffic pattern.

In this embodiment of this application, the access network device may allocate, to the first traffic based on the first traffic pattern, the radio resource that meets a service requirement of the first traffic, for example, allocate a CG resource whose period matches a period in which service data appears.

For example, the first traffic pattern is the downlink traffic pattern, and that the data packets arrive at the first network means that the data packets arrive at the access network device on the first network. In this example, the time information includes time points and/or periods at/in which the data packets of the first traffic arrive at the access network device on the first network. After obtaining the first traffic pattern, the access network device may determine, based on content included in the traffic pattern, a time point at which each data packet of the first traffic arrives at the access network device, and then may allocate a radio resource to each data packet included in the first traffic. In this example, the time information includes a time point at which the first data packet of the first traffic arrives at the access network device on the first network and a period in which the first data packet of the first traffic arrives at the access network device on the first network. It is assumed that the time point at which the first data packet of the first traffic arrives at the access network device is a first time point, and the period in which the first data packet of the first traffic arrives at the access network device is 10 ms. In this case, the access network device may configure the CG resource for the first traffic based on the first time point at which the first data packet arrives at the access network device and the period in which the data packet arrives at the access network device. The access network device may allocate, to the first data packet of the first traffic, a first CG resource corresponding to a first subframe after the first time point. In addition, the access network device may configure the periods of the CG resource as 10 subframes, and each subframe is 1 ms. For example, the access network device may notify, through control channel (radio resource control (RRC) signaling, MAC signaling, or physical layer signaling), the terminal to: receive the first data packet of the first traffic in a frequency band YYY at a time point XXX, and then receive a data packet of the first traffic in the frequency band YYY at the time point XXX every 10 ms.

For example, the first traffic pattern is the downlink traffic pattern, and that the data packets arrive at the first network means that the data packets arrive at the UPF network element on the first network. In this example, the time information includes time points and/or periods at/in which the data packets of the first traffic arrive at the UPF network element on the first network. After obtaining the first traffic pattern, the access network device may determine, based on content included in the traffic pattern, a time point at which each data packet of the first traffic arrives at the UPF network element, and then may determine, based on the time point at which each data packet of the first traffic arrives at the UPF network element and a delay between the UPF network element and the access network device, a time point at which each data packet of the first traffic arrives at the access network device. Further, the access network device may allocate a radio resource to each data packet included in the first traffic. It should be noted that, in this example, the delay between the UPF network element and the access network device may be preconfigured, may be obtained by the access network device by performing measurement for one time, may be obtained by the access network device by performing measurement for a plurality of times to obtain an average value, or may be obtained by the access network device from another device, for example, obtained from the UPF network element.

For example, the first traffic pattern is the uplink traffic pattern (traffic pattern), and that the data packets arrive at the first network means that the data packets arrive at the terminal on the first network. In this example, the time information includes time points and/or periods at/in which the data packets of the first traffic arrive at the terminal on the first network. After obtaining the first traffic pattern, the access network device may determine, based on content included in the traffic pattern, a time point at which each data packet of the first traffic arrives at the terminal, and then may allocate a radio resource to each data packet included in the first traffic.

According to the foregoing method provided in this embodiment of this application, the access network device may allocate the radio resources to the first traffic based on the time information of the first traffic, for example, the time points and/or periods at/in which the data packets of the first traffic arrive at the first network. In this way, the access network device may learn, based on the time information of the first traffic, a time point at which each data packet of the first traffic arrives at the first network. Further, the access network device allocates the radio resources to the traffic based on the time point at which each data packet arrives at the first network, so that the radio resources are more properly allocated. In addition, the time information that is of the first traffic and that is obtained by the access network device is the time information with respect to the first clock used by the first network, and the access network device belongs to the first network. Therefore, the access network device also uses the first clock. This can resolve a problem that resource allocation cannot be performed or resource allocation is inaccurate because a clock used by the access network device is different from a used clock related to the time information of the first traffic.

In a possible implementation, if the first traffic pattern or the second traffic pattern already exists in the access network device, in a handover process, the access network device may further send the first traffic pattern or the second traffic pattern to a target access network device. It should be noted that the first traffic pattern herein may be the uplink traffic pattern or the downlink traffic pattern. For ease of description, in the following, the access network device before the handover is referred to as the source access network device, and the access network device after the handover is referred to as the target access network device.

Based on the foregoing implementation, when determining that the source access network device and the target access network device use a same clock, the source access network device may send the first traffic pattern or the second traffic pattern to the target access network device.

Based on the foregoing implementation, when determining that the source access network device and the target access network device use different clocks, the source access network device may send the second traffic pattern to the target access network device.

Optionally, the source access network device may send the first traffic pattern or the second traffic pattern to the target access network device through a handover preparation request message.

Based on the foregoing possible implementation, after sending the first traffic pattern to the target access network device, the source access network device may further receive a pre-allocated radio resource from the target access network device, and send the pre-allocated radio resource to the terminal. In this way, the target access network device may obtain the first traffic pattern in the handover process, and may further pre-allocate, in the handover process, a radio resource to a data packet that needs to be transmitted. After the handover is completed, the target access network device may promptly transmit the data packet by using the pre-allocated radio resource. Therefore, time required for resource reconfiguration can be reduced.

Based on the foregoing possible implementation, after the source access network device sends the second traffic pattern to the target access network device, the target access network device may determine the first traffic pattern based on the second traffic pattern, the first relationship, and a delay between the target access network device and the core network device. It should be noted that, for how the target access network device obtains the delay between the target access network device and the core network device, refer to the foregoing description. Details are not described herein again.

In another possible implementation, if a source access network device has allocated the radio resource to the first traffic based on the first traffic pattern, in a handover process, the source access network device may send, to a target access network device, a first difference and information about the radio resources allocated to the first traffic. Further, the target access network device may pre-allocate the radio resource to the first traffic based on the first difference and the information that is about the radio resource allocated to the first traffic and that is sent by the source access network device.

The first difference may include one or more of the following items:

First, a difference between radio frame numbers of serving cells of the source access network device and radio frame numbers of serving cells of the target access network device. The difference may include a difference between a radio frame number of a source cell and a radio frame number of a target cell. The source cell is one of the serving cells of the source access network device, and the target cell is one of the serving cells of the target access network device.

Second, a difference between radio subframe numbers of serving cells of the source access network device and radio subframe numbers of serving cells of the target access network device. The difference may include a difference between a radio subframe number of a source cell and a radio subframe number of a target cell. The source cell is one of the serving cells of the source access network device, and the target cell is one of the serving cells of the target access network device.

Third, a time difference between frame boundaries of serving cells of the source access network device and frame boundaries of serving cells of the target access network device. The difference may include a time difference between a frame boundary of a source cell and a frame boundary of a target cell. The source cell is one of the serving cells of the source access network device, and the target cell is one of the serving cells of the target access network device.

A fourth item is a time difference between subframe boundaries of serving cells of the source access network device and subframe boundaries of serving cells of the target access network device. The difference may include a time difference between a subframe boundary of a source cell and a subframe boundary of a target cell. The source cell is one of the serving cells of the source access network device, and the target cell is one of the serving cells of the target access network device.

In still another possible implementation, if a source access network device has allocated the radio resources to the first traffic based on the first traffic pattern, in a handover process, the source access network device may send, to a target access network device, information about the radio resources allocated to the first traffic and a 5G time point corresponding to a specific radio frame or radio subframe of a serving cell of the source access network device. Further, the target access network device may pre-allocate the radio resource to the first traffic based on the information sent by the source access network device.

It should be noted that the first difference and the 5G time point corresponding to the radio frame or radio subframe of the serving cell of the source access network device is not limited to being sent in the handover process, and may also be periodically or aperiodically sent by the source access network device. After receiving the information, the target access network device may store the information locally, and may further use the information in the handover process.

The following describes, with reference to FIG. 5 to FIG. 9 by using an example, a method provided in an embodiment of this application.

Figure 5:
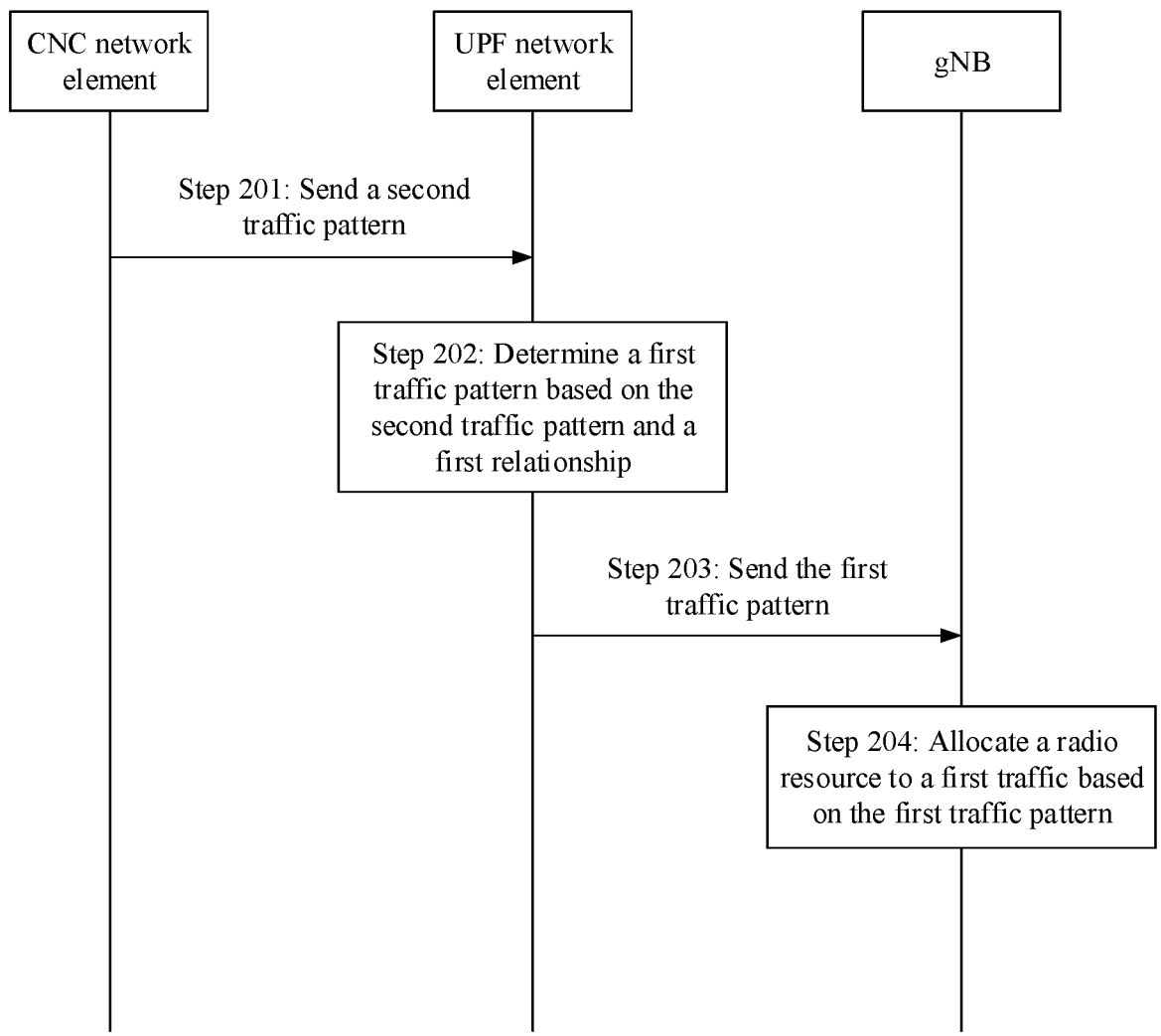
FIG. 5 is a flowchart of still another communication method according to an embodiment of this application.

FIG. 5 is a flowchart of still another communication method according to an embodiment of this application. In FIG. 5, an example in which the method is applied to the network architecture shown in FIG. 3 is used. A following example is used to describe the method provided in this embodiment of this application. A first network is the 5G network in FIG. 3, and a first clock is the 5G network clock. A second network is the TSN network, and a second clock is a TSN network clock. A first relationship is a relationship between the 5G network clock and the TSN network clock. A first traffic pattern includes time information of a first traffic with respect to the 5G network clock, and a second traffic pattern includes time information of the first traffic with respect to the TSN network clock. Time information includes time points at which data packets of the first traffic arrive at the 5G network and periods in which the data packets of the first traffic arrive at the 5G network. An access network device is the gNB, a core network device is the UPF network element, and a terminal is the UE. Referring to FIG. 5, the communication method may include the following processing procedure.

Step 201: A CNC network element sends a second traffic pattern to the UPF network element, and the UPF network element receives the second traffic pattern from the CNC network element. For example, the second traffic pattern received by the UPF network element from the CNC network element includes: A first data packet of the first traffic arrives at the UPF network element at 17:45:32 on Mar. 2, 2019, and then a packet arrives at the UPF network element every 5 seconds. It should be noted that time information in the second traffic pattern is the time information with respect to the TSN network clock. 17:45:32 on Mar. 2, 2019 on the TSN network is not 17:45:32 on Mar. 2, 2019 on the 5G network.

It should be noted that, in this embodiment of this application, if the second traffic pattern obtained/received from the CNC network element is a downlink traffic pattern, time points at which the data packets of the first traffic arrive at the first network and that are included in the time information in the second traffic pattern may be time points at which the data packets of the first traffic arrive at the UPF network element. If the second traffic pattern obtained/received from the CNC network element is an uplink traffic pattern, time points at which the data packets of the first traffic arrive at the first network and that are included in the time information in the second traffic pattern may be time points at which the data packets of the first traffic arrive at the UE.

Step 202: The UPF network element determines the first traffic pattern based on the second traffic pattern and the first relationship. For example, if the first relationship is that the 5G network clock is 5 seconds faster than the TSN network clock, the second traffic pattern includes: An example in which the first data packet of the first traffic arrives at the UPF network element at 17:45:32 on Mar. 2, 2019, and then a packet arrives at the UPF network element every 5 seconds is used. In other words, when the first data packet of the first traffic arrives at the UPF network element, a TSN time point is 17:45:32 on Mar. 2, 2019, and a time point with respect to the 5G clock is 17:45:37 on Mar. 2, 2019. Therefore, the UPF network element may determine, based on the second traffic pattern and the first relationship, that the first traffic pattern includes: The first data packet of the first traffic arrives at the UPF network element at a 5G network time point, which is 17:45:37 on Mar. 2, 2019, and then a packet arrives at the UPF network element every 5 seconds.

In this example, after determining the first traffic pattern, the UPF network element may directly send the first traffic pattern to the gNB. The UPF network element may further determine, based on a time point at which the first data packet of the first traffic arrives at the UPF network element and a delay between the UPF network element and the gNB, a time point at which the first data packet of the first traffic arrives at the gNB. The UPF network element may redetermine, as a new first traffic pattern, the time point and periods in which the data packets of the first traffic are sent, and the UPF network element sends the new first traffic pattern to the gNB. For example, if the delay between the UPF and the gNB is 3 seconds, the first traffic pattern includes: An example in which the first data packet of the first traffic arrives at the UPF network element at the 5G network time point, which is 17:45:37 on Mar. 2, 2019, and then a packet arrives at the UPF network element every 5 seconds is used. In this case, the UPF network element may further determine that the new first traffic pattern includes: The first data packet of the first traffic arrives at the gNB at a 5G network time point, which is 17:45:40 on Mar. 2, 2019, and then a packet arrives at the gNB every 5 seconds.

In this example, the delay between the UPF network element and the gNB may be preconfigured for the UPF network element, may be measured by the gNB and then sent to the UPF network element, or may be measured by the UPF network element. This is not limited in this application.

Step 203: The UPF network element sends the first traffic pattern to the gNB, and the gNB receives the first traffic pattern from the UPF network element.

Step 204: The gNB allocates a radio resource to the first traffic based on the first traffic pattern.

For example, it is assumed that the UPF network element sends, to the gNB, the first traffic pattern determined based on the second traffic pattern and the first relationship. After receiving the first traffic pattern, the gNB may determine, based on the delay between the UPF network element and the gNB and the time point at which the first data packet of the first traffic arrives at the UPF network element, a time point at which the first data packet of the first traffic arrives at the gNB. The gNB may determine, based on the time point at which the first data packet arrives at the gNB and a period in which the first data packet arrives at the gNB, time points at which all data packets of the first traffic arrive at the gNB. Further, the gNB may allocate the radio resource to the first traffic based on the time points at which the data packets arrive.

For another example, it is assumed that the UPF network element sends the new first traffic pattern to the gNB. The new first traffic pattern includes a time point at which the first data packet of the first traffic arrives at the gNB and a period in which the first data packet of the first traffic arrives at the gNB. In addition, the gNB may determine, based on the time point at which the first data packet arrives at the gNB and the period in which the first data packet arrives at the gNB, time points at which all data packets of the first traffic arrive at the gNB. Further, the gNB may allocate the radio resource to the first traffic based on the time points at which the data packets arrive.

Figure 6:
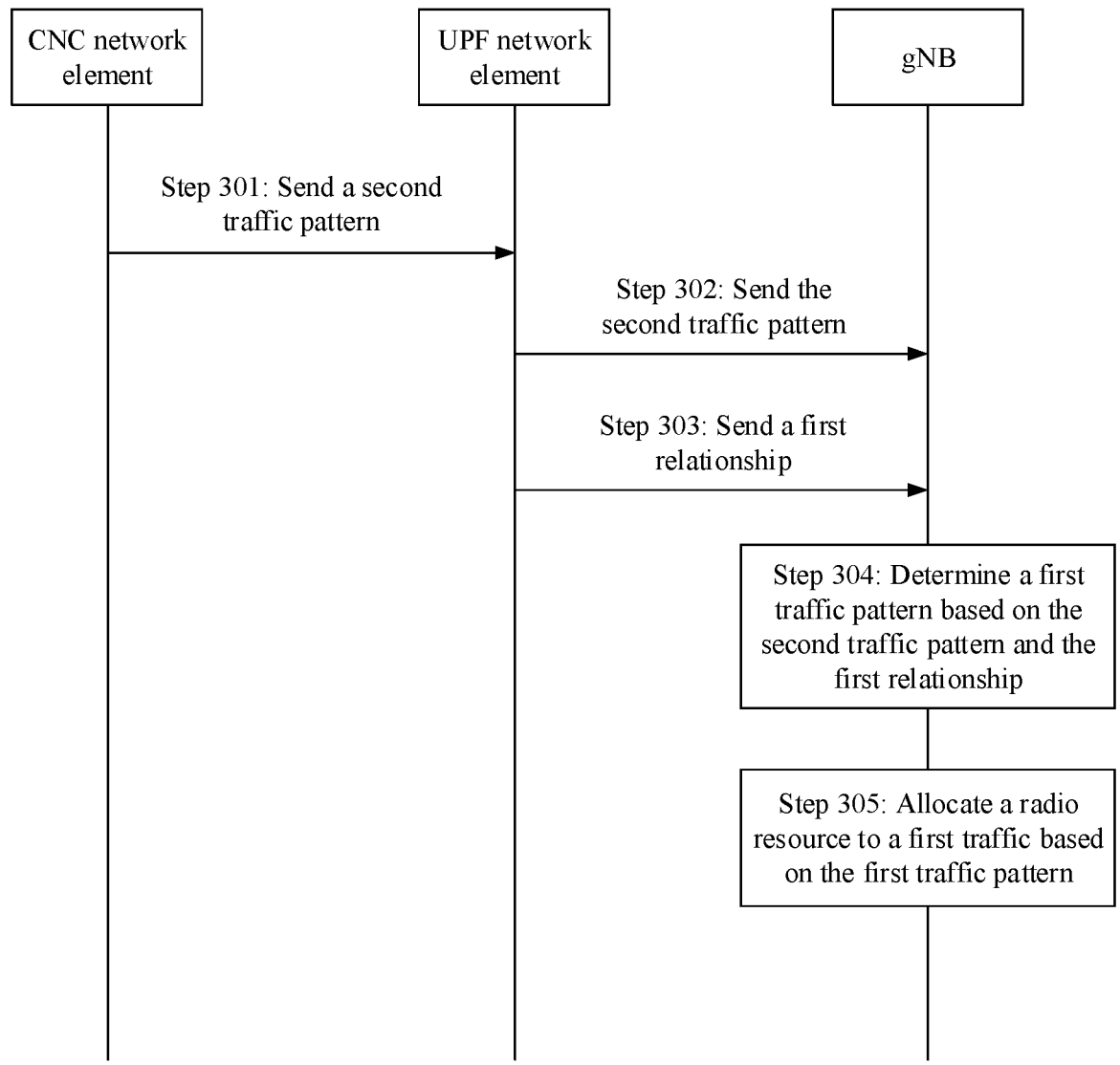
FIG. 6 is a flowchart of still another communication method according to an embodiment of this application.

FIG. 6 is a flowchart of still another communication method according to an embodiment of this application. In FIG. 6, an example in which the method is applied to the network architecture shown in FIG. 3 is used. A following example is used to describe the method provided in this embodiment of this application. A first network is the 5G network in FIG. 3, and a first clock is the 5G network clock. A second network is the TSN network, and a second clock is a TSN network clock. A first relationship is a relationship between the 5G network clock and the TSN network clock. A first traffic pattern includes time information of a first traffic with respect to the 5G network clock, and a second traffic pattern includes time information of the first traffic with respect to the TSN network clock. Time information includes time points at which data packets of the first traffic arrive at the 5G network and periods in which the data packets of the first traffic arrive at the 5G network. An access network device is the gNB, a core network device is the UPF network element, and a terminal is the UE. Referring to FIG. 6, the communication method may include the following processing procedure.

Step 301: A CNC network element sends a second traffic pattern to the UPF network element, and the UPF network element receives the second traffic pattern from the CNC network element.

An example in which the second traffic pattern is a downlink traffic pattern is used for description. In other words, time points at which the data packets of the first traffic arrive at the first network and that are included in the time information in the second traffic pattern are time points at which the data packets of the first traffic arrive at the UPF.

Step 302: The UPF network element sends the second traffic pattern to the gNB, and the gNB receives the second traffic pattern from the UPF network element.

Step 303: The UPF network element sends the first relationship to the gNB, and the gNB receives the first relationship from the UPF network element.

There may be a plurality of implementations for step 303, and this application provides three possible implementations.

Implementation 1: The UPF network element sends the first relationship to the gNB for only one time, and the gNB subsequently always uses the first relationship.

Implementation 2: The UPF network element periodically determines the first relationship based on a specific period, and may periodically send the first relationship to the gNB.

Implementation 3: The UPF network element first sends the first relationship to the gNB for one time, and then the UPF network element periodically calculates the first relationship; and when a variation of the first relationship exceeds a preset threshold, the UPF network element sends the first relationship to the gNB again.

It should be noted that a sequence in which step 302 and step 303 are performed is not limited in this application. For example, step 302 and step 303 may be simultaneously performed, step 302 may be first performed, or step 303 may be first performed.

Step 304: The gNB determines the first traffic pattern based on the second traffic pattern and the first relationship. It may be understood that time points at which the data packets of the first traffic arrive at the first network and that are included in the time information in the first traffic pattern determined by using step 304 are time points at which the data packets of the first traffic arrive at the UPF.

Step 305: The gNB allocates a radio resource to the first traffic based on the first traffic pattern.

For example, the gNB may determine, based on a time point at which a first data packet of the first traffic arrives at the UPF network element and that is included in the first traffic pattern, and a delay between the UPF network element and the gNB, a time point at which the first data packet of the first traffic arrives at the gNB. In addition, the gNB may determine, based on the time point at which the first data packet arrives at the gNB and a period in which the first data packet arrives at the gNB, time points at which all data packets of the first traffic arrive at the gNB. Further, the gNB may allocate the radio resource to the first traffic based on the time points at which the data packets arrive.

In this example, the delay between the UPF network element and the gNB may be preconfigured for the gNB, may be measured by the gNB, or may be measured by the UPF network element and then sent to the gNB. This is not limited in this application.

In this example, there is another implementation for step 304. The gNB determines the first traffic pattern based on the second traffic pattern, the first relationship, and the delay between the UPF network element and the gNB. It may be understood that time points at which the data packets of the first traffic arrive at the first network and that are included in the time information in the first traffic pattern determined by using the implementation are time points at which the data packets of the first traffic arrive at the gNB. When the implementation is used, the gNB may determine, based on a time point at which the first data packet of the first traffic arrives at the gNB and a period in which the first data packet of the first traffic arrives at the gNB, time points at which all data packets of the first traffic arrive at the gNB, where the time point and the period are included in the first traffic pattern. Further, the gNB may allocate the radio resource to the first traffic based on the time points at which the data packets arrive.

Figure 7:
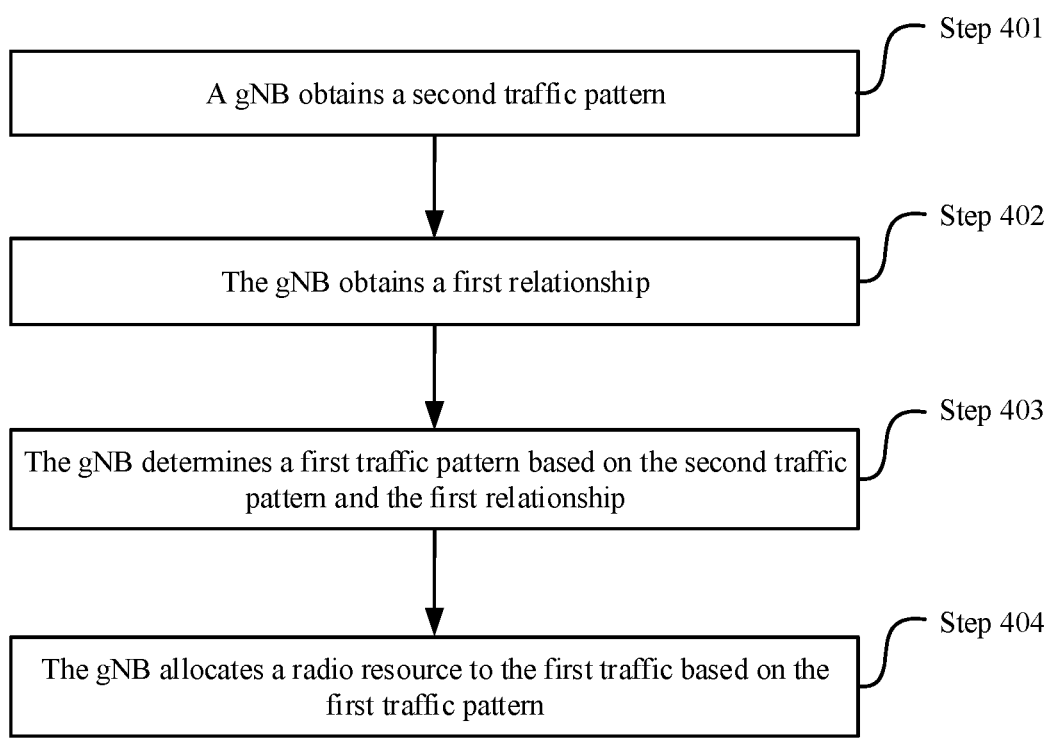
FIG. 7 is a flowchart of still another communication method according to an embodiment of this application.

FIG. 7 is a flowchart of still another communication method according to an embodiment of this application. In FIG. 7, an example in which the method is applied to the network architecture shown in FIG. 3 is used. A following example is used to describe the method provided in this embodiment of this application. A first network is the 5G network in FIG. 3, and a first clock is the 5G network clock. A second network is the TSN network, and a second clock is a TSN network clock. A first relationship is a relationship between the 5G network clock and the TSN network clock. A first traffic pattern includes time information of a first traffic with respect to the 5G network clock, and a second traffic pattern includes time information of the first traffic with respect to the TSN network clock. Time information includes time points at which data packets of the first traffic arrive at the 5G network and periods in which the data packets of the first traffic arrive at the 5G network. An access network device is the gNB, a core network device is the UPF network element, and a terminal is the UE. Referring to FIG. 7, the communication method may include the following processing procedure.

Step 401: The gNB obtains a second traffic pattern.

For example, the gNB may receive the second traffic pattern from a CNC network element. The second traffic pattern may include a time point at which a first data packet of the first traffic arrives at the UPF network element and a period in which the first data packet of the first traffic arrives at the UPF network element.

For another example, the gNB may receive the second traffic pattern from the UPF network element. The second traffic pattern may include a time point at which a first data packet of the first traffic arrives at the UPF network element/gNB and a period in which the first data packet of the first traffic arrives at the UPF network element/gNB.

For another example, the gNB may receive the second traffic pattern from the UE. The second traffic pattern may include a time point at which a first data packet of the first traffic arrives at the UE and a period in which the first data packet of the first traffic arrives at the UE.

Step 402: The gNB obtains the first relationship.

For example, the gNB determines the first relationship based on the first clock and the second clock.

For another example, the gNB obtains the first relationship from the UPF network element.

For another example, the gNB obtains the first relationship from the UE.

It should be noted that a sequence in which step 401 and step 402 are performed is not limited in this application. For example, step 401 and step 402 may be simultaneously performed, step 401 may be first performed, or step 402 may be first performed.

Step 403: The gNB determines the first traffic pattern based on the second traffic pattern and the first relationship.

Step 404: The gNB allocates a radio resource to the first traffic based on the first traffic pattern.

For example, for downlink transmission, the gNB may determine, based on a time point at which the first data packet of the first traffic arrives at the UPF network element and that is included in the first traffic pattern, and a delay between the UPF network element and the gNB, a time point at which the first data packet of the first traffic arrives at the gNB. In addition, the gNB may determine, based on the time point at which the first data packet arrives at the gNB and a period in which the first data packet arrives at the gNB, time points at which all data packets of the first traffic arrive at the gNB. Further, the gNB may allocate the radio resource to the first traffic based on the time points at which the data packets arrive.

For another example, for uplink transmission, the gNB may determine, based on a time point at which the first data packet of the first traffic arrives at the UE and a period in which the first data packet of the first traffic arrives at the UE, time points at which all data packets of the first traffic arrive at the UE, where the time point and the period are included in the first traffic pattern. Further, the gNB may allocate the radio resource to the first traffic based on the time points at which the data packets arrive.

For another example, for downlink transmission, the gNB may determine, based on a time point at which the first data packet of the first traffic arrives at the gNB and a period in which the first data packet of the first traffic arrives at the gNB, time points at which all data packets of the first traffic arrive at the gNB, where the time point and the period are included in the first traffic pattern. Further, the gNB may allocate the radio resource to the first traffic based on the time points at which the data packets arrive.

Figure 8:
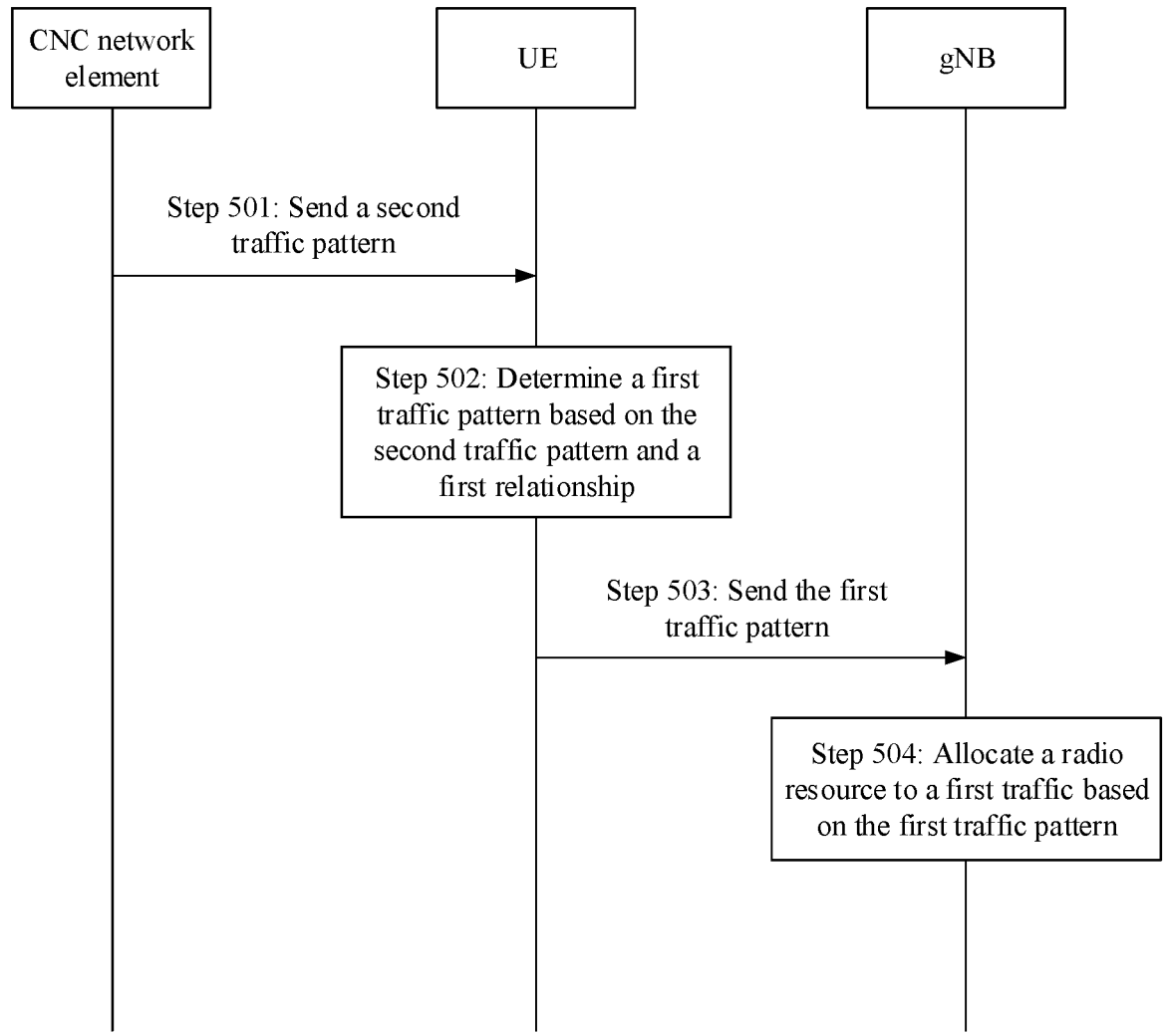
FIG. 8 is a flowchart of still another communication method according to an embodiment of this application.

FIG. 8 is a flowchart of still another communication method according to an embodiment of this application. In FIG. 8, an example in which the method is applied to the network architecture shown in FIG. 3 is used. A following example is used to describe the method provided in this embodiment of this application. A first network is the 5G network in FIG. 3, and a first clock is the 5G network clock. A second network is the TSN network, and a second clock is a TSN network clock. A first relationship is a relationship between the 5G network clock and the TSN network clock. A first traffic pattern includes time information of a first traffic with respect to the 5G network clock, and a second traffic pattern includes time information of the first traffic with respect to the TSN network clock. Time information includes time points at which data packets of the first traffic arrive at the 5G network and periods in which the data packets of the first traffic arrive at the 5G network. An access network device is the gNB, a core network device is the UPF network element, and a terminal is the UE. Referring to FIG. 8, the communication method may include the following processing procedure.

Step 501: A CNC network element sends the second traffic pattern to the UE, and the UE receives the second traffic pattern from the CNC network element. An example in which the second traffic pattern is an uplink traffic pattern is used for description. In other words, time points at which the data packets of the first traffic arrive at the first network and that are included in the time information in the second traffic pattern are time points at which the data packets of the first traffic arrive at the UE.

For example, the CNC network element may send the second traffic pattern to the UE by using a TSN adaptation function on a UE side.

Step 502: The UE determines the first traffic pattern based on the second traffic pattern and the first relationship.

In this example, the UE may determine the first relationship based on the first clock and the second clock, or may obtain the first relationship from the TSN adaptation function on the UE side.

In this example, when the CNC network element sends the second traffic pattern to the UE by using the TSN adaptation function on the UE side, the TSN adaptation function on the UE side may also determine the first traffic pattern based on the second traffic pattern and the first relationship. After determining the first traffic pattern, the TSN adaptation function on the UE side may send the first traffic pattern to the UE.

Step 503: The UE sends the first traffic pattern to the gNB, and the gNB receives the first traffic pattern from the UE.

In this example, both the first traffic pattern and the second traffic pattern are uplink traffic patterns.

Step 504: The gNB allocates a radio resource to the first traffic based on the first traffic pattern.

A following example is used: The second traffic pattern includes that a first data packet of the first traffic arrives at the UE at 17:45:32 on Mar. 2, 2019, and then a packet arrives at the UE every 5 seconds; and the first relationship is that the 5G network clock is 5 seconds faster than the TSN network clock. The UE may determine, based on the second traffic pattern and the first relationship, that the first traffic pattern includes that the first data packet of the first traffic arrives at the UE at 17:45:37 on Mar. 2, 2019, and then a data packet arrives at the UE every 5 seconds. The UE sends the first traffic pattern to the gNB. The gNB may determine, based on a time point at which the first data packet of the first traffic arrives at the UE and a period in which the first data packet of the first traffic arrives at the UE, time points at which all data packets of the first traffic arrive at the UE, where the time point and the period are included in the first traffic pattern. Further, the gNB may allocate the radio resource to the first traffic based on the time points at which the data packets arrive.

An example in which the access network device related in embodiments of this application is a source access network device is used. After the source access network device obtains the first traffic pattern or the second traffic pattern by using a method provided in embodiments of this application, in a handover process, the source access network device may send the first traffic pattern or the second traffic pattern to the target access network device through a handover preparation request. The following uses an example for description.

Figure 9:
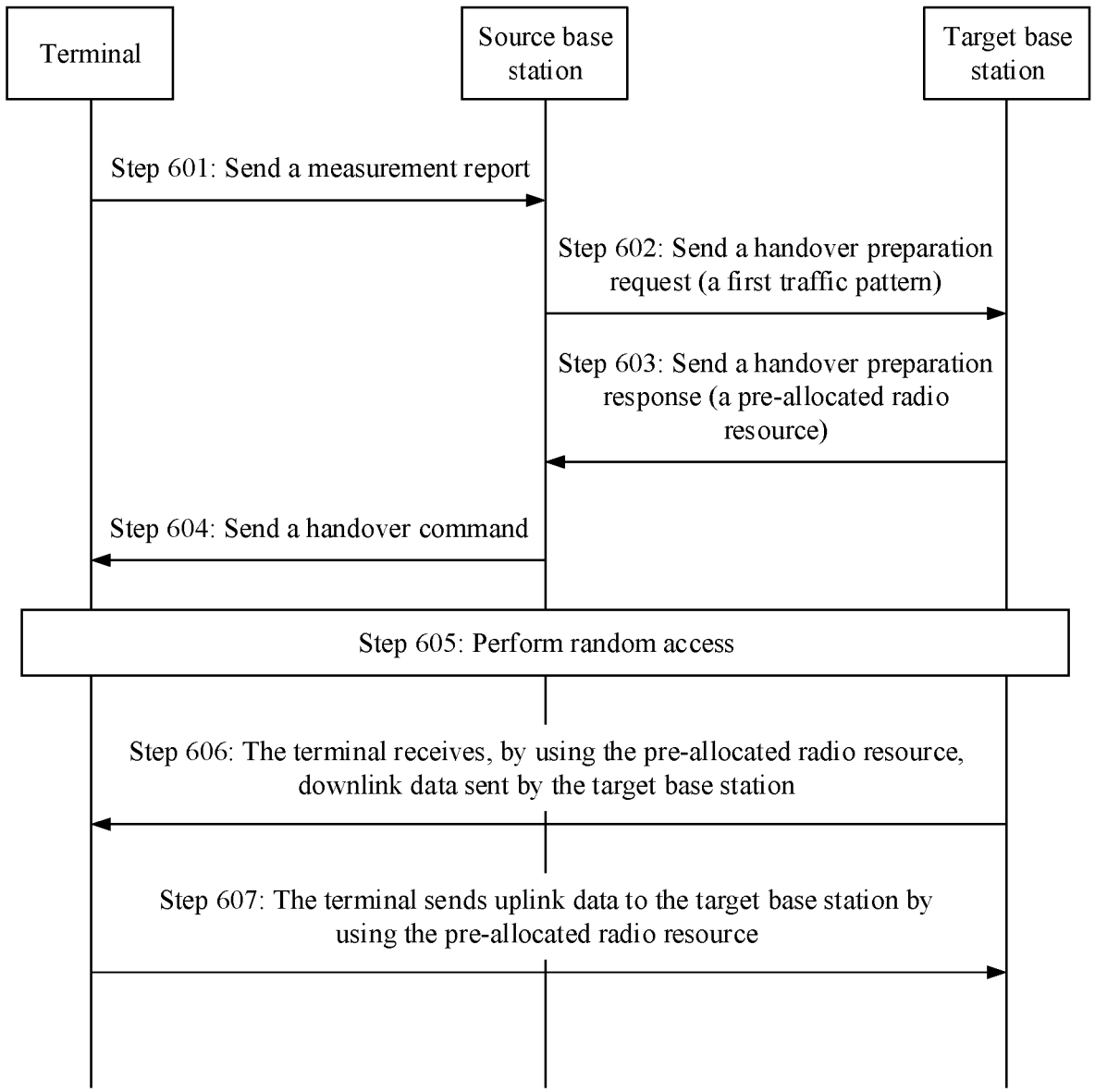
FIG. 9 is a flowchart of still another communication method according to an embodiment of this application.

FIG. 9 is a flowchart of still another communication method according to an embodiment of this application. In FIG. 9, an example in which an access network device is a base station is used for description. In other words, an example in which the source access network device related in this application is a source base station and the target access network device is a target base station is used to describe the method provided in this embodiment of this application. Referring to FIG. 9, the communication method may include the following processing procedure.

Step 601: A terminal sends a measurement report to the source base station, and the source base station receives the measurement report from the terminal.

Step 602: The source base station sends a handover preparation request to the target base station, and the target base station receives the handover preparation request from the source base station. The handover preparation request may include a first traffic pattern or a second traffic pattern. After receiving the measurement report sent by the terminal, if determining that signal quality of a serving cell of the target base station is better than signal quality of a serving cell of the source base station, the source base station may decide to hand over the terminal to the serving cell of the target base station, and may further send the handover preparation request to the target base station.

In a possible implementation, when determining that the source base station and the target base station use a same clock, the source base station may add the first traffic pattern or the second traffic pattern to the handover preparation request sent to the target base station.

In another possible implementation, when determining that the source base station and the target access network device use different clocks, the source base station may add the second traffic pattern to the handover preparation request sent to the target base station.

In this example, if the source base station has allocated a radio resource to a first traffic based on the first traffic pattern, in a handover process, the source base station may send, to the target base station through the handover preparation request, information about the radio resource allocated to the first traffic. Further, the target base station may pre-allocate the radio resource to the first traffic based on a second difference and the information sent by the source base station. The information about the radio resource allocated to the first traffic may include a radio frame number in which the radio resource allocated to the first traffic is located, a radio subframe number in which the radio resource allocated to the first traffic is located, and the like.

The second difference may include one or more of the following items.

A first item is a difference between a radio frame number of a source cell and a radio frame number of a target cell.

A second item is a difference between a radio subframe number of the source cell and a radio subframe number of the target cell.

A third item is a time difference between a frame boundary of the source cell and a frame boundary of the target cell.

A fourth item is a time difference between a subframe boundary of the source cell and a subframe boundary of the target cell.

In this embodiment, the source cell is one of serving cells of the source base station, and the target cell is one of serving cells of the target base station.

Optionally, the second difference may be pre-stored in the target base station, may be obtained by the target base station from another device, for example, obtained from the source base station, or may be obtained through calculation by the target base station. This is not limited in this application. When the target base station obtains the second difference from the source base station, the target base station may obtain the second difference in the handover process, or may obtain the second difference in another process. This is not limited in this application.

For example, the difference between a radio frame number of the source cell and a radio frame number of the target cell or the difference between a radio subframe number of the source cell and a radio subframe number of the target cell is obtained through calculation by the target base station. The target base station may obtain, from the source base station, a 5G time point corresponding to a radio frame whose SFN is equal to X and that is of the source cell. The target base station may deduce a radio frame that is of the target base station and that is corresponding to the 5G time point. Further, the target base station may calculate the difference between a radio frame number of the source cell and a radio frame number of the target cell or the difference between a radio subframe number of the source cell and a radio subframe number of the target cell.

In a possible implementation, a radio resource reserved by the target base station in the target cell may be the same as a radio resource allocated by the source cell. For example, if the source base station allocates, to the first traffic, a radio resource whose subframe number is YYYY and that is in a radio frame whose radio frame number is XXX, and a radio frame number of the target cell is 2 greater than a radio frame number of the source cell, the target base station may reserve, for the first traffic, a radio resource whose subframe number is YYYY and that is in a radio frame whose radio frame number is XXX+2.

Step 603: The target base station sends a handover preparation response to the source base station, and the source base station receives the handover preparation response from the target base station. The handover preparation response includes a pre-allocated radio resource.

Because both the target base station and the source base station use a common "5G network clock", after receiving the first traffic pattern sent by the source base station, the target base station may pre-allocate the radio resource to the terminal based on the 5G network clock maintained by the target base station. In addition, the target base station may add the pre-allocated radio resource to the handover preparation response sent to the source base station. Alternatively, after receiving the second traffic pattern sent by the source base station, the target base station may determine the first traffic pattern based on the second traffic pattern, a first relationship, and a delay between the target base station and a core network device. It should be noted that, for how the target base station obtains the delay between the target base station and the core network device, refer to the foregoing description. Details are not described herein again.

Step 604: The source base station sends a handover command to the terminal, and the terminal receives the handover command from the source base station. The handover command carries the pre-allocated radio resource. The pre-allocated radio resource may include one or more sets of uplink resources and/or downlink resources. For example, the pre-allocated radio resource may include a radio resource of a ZZZ symbol on a VVV subband in a YYYY subframe of an XXX radio frame of the serving cell of the target base station, and a subcarrier spacing, a CP, an MCS, a pilot parameter, and the like that are used for data transmission.

After the terminal receives the pre-allocated radio resource, once the terminal establishes a connection to the target base station and determines a radio frame number and a radio subframe number of the serving cell of the target base station, the terminal may use the pre-allocated radio resource to perform the data transmission with the target base station. Refer to step 605 to step 607.

Step 605: The terminal performs random access to access the target base station.

Step 606: The terminal receives, by using the pre-allocated radio resource, downlink data sent by the target base station.

Step 607: The terminal sends uplink data to the target base station by using the pre-allocated radio resource.

The foregoing mainly describes solutions provided in embodiments of this application from a perspective of interaction between a access network device and a terminal or interaction between the access network device and a core network device. It may be understood that, to implement the foregoing functions, the access network device, the terminal, and the core network device include hardware structures and/or software modules corresponding to the functions. With reference to the units and algorithm steps described in embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of technical solutions in embodiments of this application.

In embodiments of this application, function unit division may be performed on the access network device, the terminal, and the core network device based on the foregoing method examples. For example, each function unit may be obtained through division based on a corresponding function, or two or more functions may be integrated into one processing unit. The integrated unit may be implemented in a form of hardware, or may be implemented in a form of a software functional unit.

Embodiments of this application further provide an apparatus configured to implement any one of the foregoing methods. For example, an apparatus is provided and configured to implement the steps performed by the access network device in any one of the foregoing methods. For another example, another apparatus is further provided and configured to implement the steps performed by the terminal in any one of the foregoing methods. For another example, another apparatus is further provided and configured to implement the steps performed by the core network device in any one of the foregoing methods.

Figure 10:
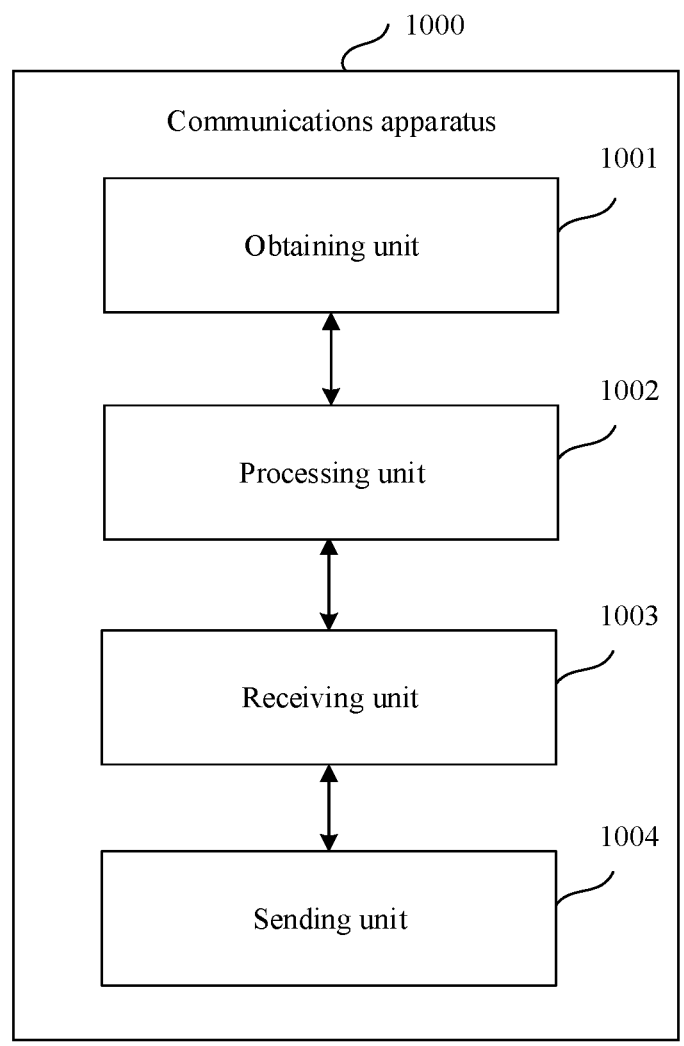
FIG. 10 is a schematic structural diagram of a communications apparatus according to an embodiment of this application.

In a possible implementation, an embodiment of this application provides a communications apparatus 1000. The communications apparatus 1000 may be applied to an access network device. FIG. 10 is a schematic structural diagram of the communications apparatus 1000 according to the embodiment of this application. Referring to FIG. 10, the communications apparatus 1000 may include an obtaining unit 1001 and a processing unit 1002. In an implementation, the communications apparatus 1000 may further include a receiving unit 1003 and a sending unit 1004. The obtaining unit 1001 may be configured to obtain a first traffic pattern. The processing unit 1002 may be configured to allocate a radio resource to a first traffic based on the first traffic pattern.

Figure 11:
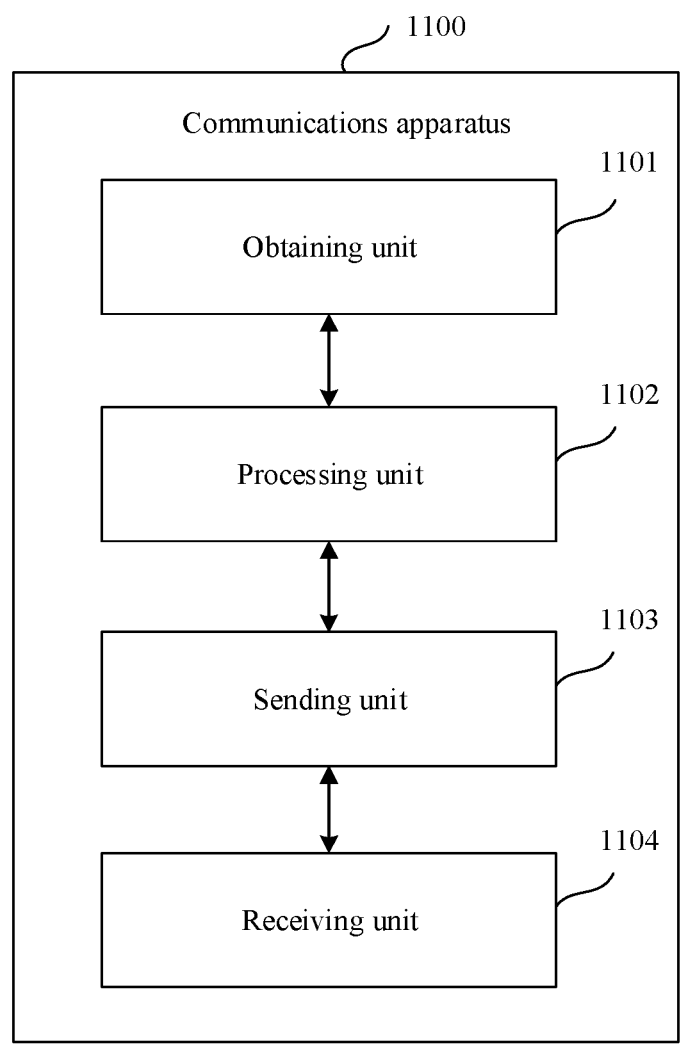
FIG. 11 is a schematic structural diagram of another communications apparatus according to an embodiment of this application.

In another possible implementation, an embodiment of this application provides a communications apparatus 1100. The communications apparatus 1100 may be applied to a terminal. FIG. 11 is a schematic structural diagram of the communications apparatus 1100 according to the embodiment of this application. Referring to FIG. 11, the communications apparatus 1100 may include an obtaining unit 1101, a processing unit 1102, and a sending unit 1103. In an implementation, the communications apparatus 1100 may further include a receiving unit 1104. The obtaining unit 1101 may be configured to obtain a second traffic pattern. The processing unit 1102 may be configured to generate a first traffic pattern based on the second traffic pattern and a first relationship. The sending unit 1103 may be configured to send the first traffic pattern to an access network device.

Figure 12:
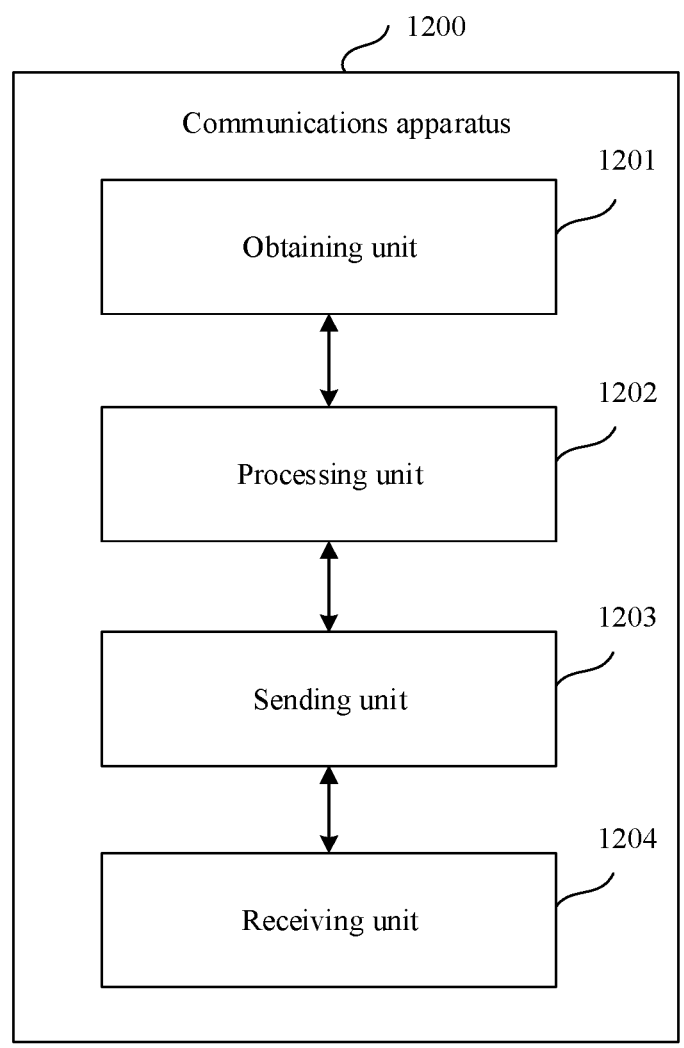
FIG. 12 is a schematic structural diagram of still another communications apparatus according to an embodiment of this application.

In still another possible implementation, an embodiment of this application provides a communications apparatus 1200. The communications apparatus 1200 may be applied to a core network device. FIG. 12 is a schematic structural diagram of the communications apparatus 1200 according to the embodiment of this application. Referring to FIG. 12, the communications apparatus 1200 may include an obtaining unit 1201, a processing unit 1202, and a sending unit 1203. In an implementation, the communications apparatus 1200 may further include a receiving unit 1204. The obtaining unit 1201 may be configured to obtain a second traffic pattern. The processing unit 1202 may be configured to generate a first traffic pattern based on the second traffic pattern and a first relationship. The sending unit 1203 may be configured to send the first traffic pattern to an access network device or a terminal.

The first traffic pattern includes time information of the first traffic with respect to a first clock, and the first clock is a clock used by a first network. The second traffic pattern includes time information of the first traffic with respect to a second clock, and the second clock is a clock used by a second network. The time information includes a time point and/or a period at/in which a data packet of the first traffic arrives at the first network, and the first relationship is a relationship between the first clock and the second clock.

In embodiments of this application, the access network device, the terminal, and the core network device may be devices on the first network.

In an exemplary embodiment, the receiving unit 1003 may be configured for the access network device to receive the first traffic pattern from the core network device, receive the first traffic pattern from the terminal, or receive the first traffic pattern from another access network device.

In an exemplary embodiment, the processing unit 1002 may generate the first traffic pattern based on the second traffic pattern and the first relationship.

In an exemplary embodiment, the receiving unit 1003 may be configured to receive the second traffic pattern from the core network device, receive the second traffic pattern from the terminal, or receive the second traffic pattern from a centralized network configuration network element. The centralized network configuration network element belongs to the second network.

In an exemplary embodiment, the receiving unit 1003 may be configured to receive the first relationship from the core network device.

In an exemplary embodiment, the obtaining unit 1001 is configured to locally obtain the first relationship.

In an exemplary embodiment, the processing unit 1002 determines the first relationship based on the second clock and the first clock.

In an exemplary embodiment, the receiving unit 1003 may periodically receive the first relationship from the core network device.

In an exemplary embodiment, the sending unit 1004 may further send the first traffic pattern to a target access network device.

In an exemplary embodiment, the receiving unit 1003 may receive a pre-allocated radio resource from the target access network device. Based on this design, the sending unit 1004 may further send the pre-allocated radio resource to the terminal.

In an exemplary embodiment, the receiving unit 1104 may receive the second traffic pattern from the centralized network configuration network element, and the centralized network configuration network element belongs to the second network.

In an exemplary embodiment, the processing unit 1102 may determine the first relationship based on the second clock and the first clock.

In an exemplary embodiment, the receiving unit 1104 may receive the first relationship from an adaptation function entity. The adaptation function entity is configured to adapt the first network and the second network.

In an exemplary embodiment, the sending unit 1203 may periodically send the first relationship to the access network device.

In an exemplary embodiment, the processing unit 1202 periodically determines the first relationship, and sends the first relationship to the access network device through the sending unit 1203 when the first relationship meets a first condition.

Optionally, the first condition may be that a change value of the first relationship exceeds a threshold, or the first condition may be that a time interval in which the first relationship is sent reaches a threshold. The threshold in this application may be an empirical value, and is not limited.

In an exemplary embodiment, the receiving unit 1204 may receive the second traffic pattern from the centralized network configuration network element, and the centralized network configuration network element belongs to the second network.

In an exemplary embodiment, the processing unit 1202 may determine the first relationship based on the second clock and the first clock.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more specific integrated circuits (application specific integrated circuit, ASIC), one or more microprocessors (digital signal processor, DSP), one or more field programmable gate arrays (field programmable gate array, FPGA), or a combination of at least two of these types of integrated circuits. For another example, when a unit in the apparatus is implemented by a program scheduled by a processing element, the processing element may be a general purpose processor, for example, a central processing unit (CPU) or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

The access network device exchanges information with the terminal by using an interface protocol between the access network device and the terminal, for example, receives the first traffic pattern, the second traffic pattern, or the first relationship. The access network device is wirelessly connected to the terminal, and the access network device exchanges information with the terminal through a wireless interface, for example, receives the first traffic pattern, the second traffic pattern, or the first relationship. The access network device exchanges information with the core network device by using an interface protocol between the access network device and the core network device, for example, receives the first traffic pattern, the second traffic pattern, or the first relationship. The access network device is wirelessly connected to the core network device, and the access network device exchanges information with the core network device through a wireless interface, for example, receives the first traffic pattern, the second traffic pattern, or the first relationship.

Figure 13:
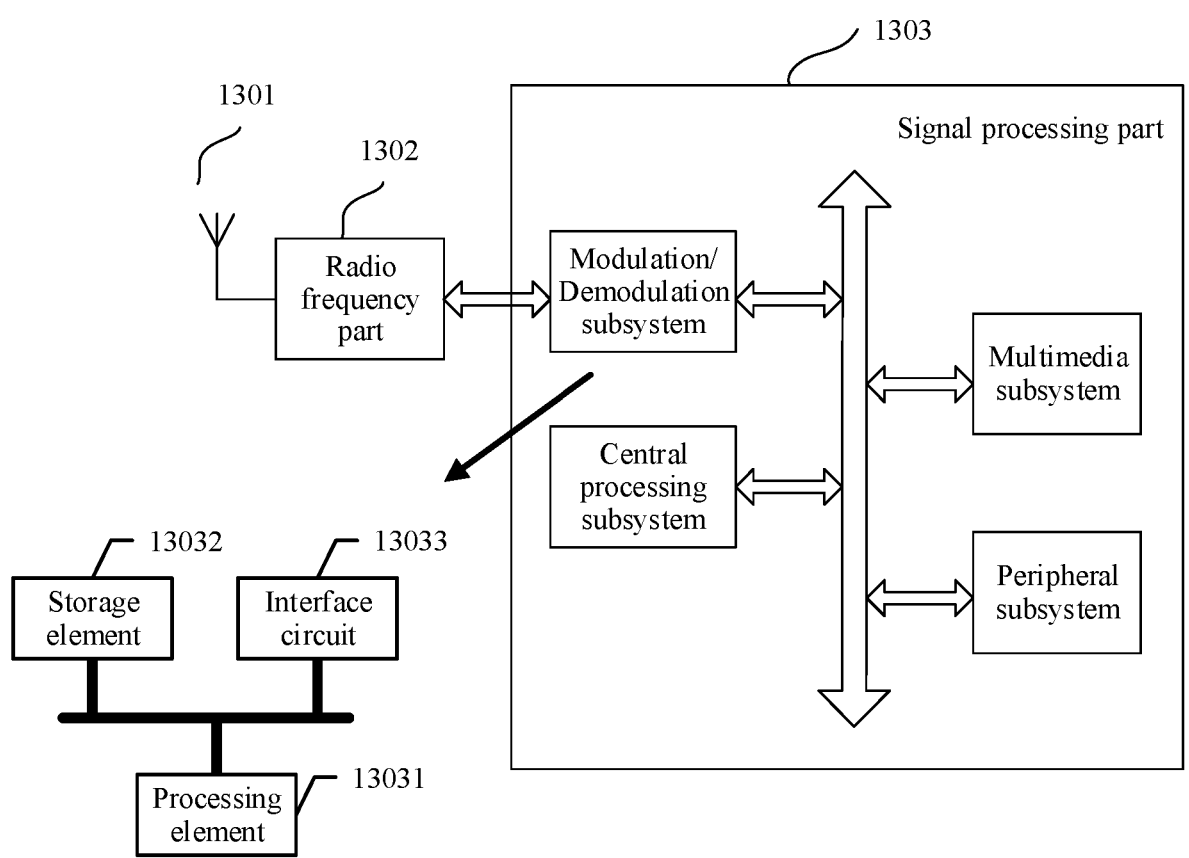
FIG. 13 is a schematic structural diagram of a terminal according to an embodiment of this application.

FIG. 13 is a schematic structural diagram of a terminal according to an embodiment of this application. The terminal may be the terminal in the foregoing embodiments and is configured to implement operations of the terminal in the foregoing embodiments. As shown in FIG. 13, the terminal includes an antenna 1301, a radio frequency part 1302, and a signal processing part 1303. The antenna 1301 is connected to the radio frequency part 1302. In a downlink direction, the radio frequency part 1302 receives, through the antenna 1301, information sent by a network device, and sends, to the signal processing part 1303 for processing, the information sent by the network device. In an uplink direction, the signal processing part 1303 processes information from the terminal, and sends the information to the radio frequency part 1302. The radio frequency part 1302 processes the information from the terminal, and then sends processed information to the network device by using the antenna 1301.

The signal processing part 1303 may include a modem subsystem, configured to process data at each communications protocol layer. The signal processing part 1303 may further include a central processing subsystem, configured to implement processing of an operating system and an application layer of the terminal. In addition, the signal processing part 1303 may further include another subsystem, for example, a multimedia subsystem or a peripheral subsystem. The multimedia subsystem is configured to control a camera or a screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 13031, for example, include one main control CPU and another integrated circuit. In addition, the modem subsystem may further include a storage element 13032 and an interface circuit 13033. The storage element 13032 is configured to store data and a program. However, a program used to perform the methods performed by the terminal in the foregoing methods may not be stored in the storage element 13032, but is stored in a memory outside the modem subsystem, and is loaded and used by the modem subsystem when to be used. The interface circuit 13033 is configured to communicate with another subsystem. The foregoing apparatus used for the terminal may be located in the modem subsystem. The modem subsystem may be implemented by using a chip. The chip includes at least one processing element and interface circuit. A processing element is configured to perform the steps of any method performed by the terminal. An interface circuit is configured to communicate with another apparatus. In an implementation, units of the terminal that implement the steps in the foregoing methods may be implemented by a processing element scheduling a program. For example, an apparatus applied to the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiments.

In still another implementation, units that implement the steps in the foregoing methods and that are in the apparatus applied to the terminal may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing methods may be integrated together, and implemented in a form of a system-on-a-chip (SOC). The SOC chip is configured to implement the foregoing methods. At least one processing element and storage element may be integrated into the chip, and a processing element invokes a program stored in a storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the processing element invoking a program, and functions of some units may be implemented by the integrated circuit.

The foregoing apparatus applied to the terminal may include at least one processing element and interface circuit. The at least one processing element is configured to perform any method performed by the terminal provided in the foregoing method embodiments. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processor element in combination with an instruction; or may certainly perform, by combining the first manner and the second manner, some or all steps performed by the terminal.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

Figure 14:
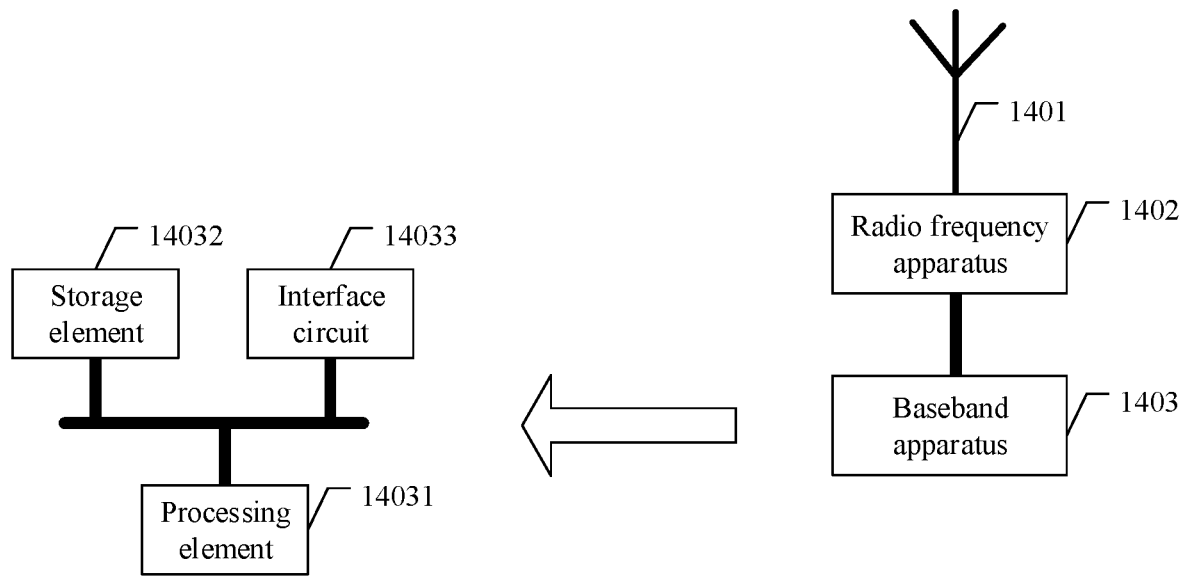
FIG. 14 is a schematic structural diagram of an access network device according to an embodiment of this application.

FIG. 14 is a schematic structural diagram of an access network device according to an embodiment of this application. The network device is configured to implement operations of the access network device in the foregoing embodiments. As shown in FIG. 14, the access network device includes an antenna 1401, a radio frequency apparatus 1402, and a baseband apparatus 1403. The antenna 1401 is connected to the radio frequency apparatus 1402. In an uplink direction, the radio frequency apparatus 1402 receives, by using the antenna 1401, information sent by a terminal, and sends, to the baseband apparatus 1403 for processing, the information sent by the terminal. In a downlink direction, the baseband apparatus 1403 processes the information from the terminal, and sends the information to the radio frequency apparatus 1402. The radio frequency apparatus 1402 processes the information from the terminal, and then sends processed information to the terminal by using the antenna 1401.

The baseband apparatus 1403 may include one or more processing elements 14031, for example, include one main control CPU and another integrated circuit. In addition, the baseband apparatus 1403 may further include a storage element 14032 and an interface circuit 14033. The storage element 14032 is configured to store a program and data. The interface circuit 14033 is configured to exchange information with the radio frequency apparatus 1402, and the interface circuit is, for example, a common public radio interface (CPRI). The foregoing apparatus applied to the access network device may be located in the baseband apparatus 1403. For example, the foregoing apparatus applied to the access network device may be a chip in the baseband apparatus 1403. The chip includes at least one processing element and interface circuit. A processing element is configured to perform the steps of any method performed by the access network device. An interface circuit is configured to communicate with another apparatus. In an implementation, units of the access network device that implement the steps in the foregoing methods may be implemented by a processing element scheduling a program. For example, an apparatus applied to the access network device includes a processing element and a storage element. The processing element invokes a program stored in the storage element, to perform the methods performed by the access network device in the foregoing method embodiments. The storage element may be a storage element located on a same chip as the processing element, that is, an on-chip storage element, or may be a storage element located on a different chip from the processing element, that is, an off-chip storage element.

In another implementation, units that implement the steps in the foregoing methods and that are in the apparatus applied to the access network device may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the access network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and a processing element invokes a program stored in a storage element to implement the foregoing methods performed by the access network device. Alternatively, at least one integrated circuit may be integrated into the chip, to implement the foregoing methods performed by the access network device. Alternatively, with reference to the foregoing implementations, functions of some units may be implemented by the processing element invoking a program, and functions of some units may be implemented by the integrated circuit.

The foregoing apparatus applied to the access network device may include at least one processing element and interface circuit. The at least one processing element is configured to perform any method performed by the access network device provided in the foregoing method embodiments. The processing element may perform some or all steps performed by the access network device, in a first manner, to be specific, by invoking the program stored in the storage element; or may perform some or all steps performed by the access network device, in a second manner, to be specific, by using a hardware integrated logic circuit in the processor element in combination with an instruction; or may certainly perform, by combining the first manner and the second manner, some or all steps performed by the access network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

Figure 15:
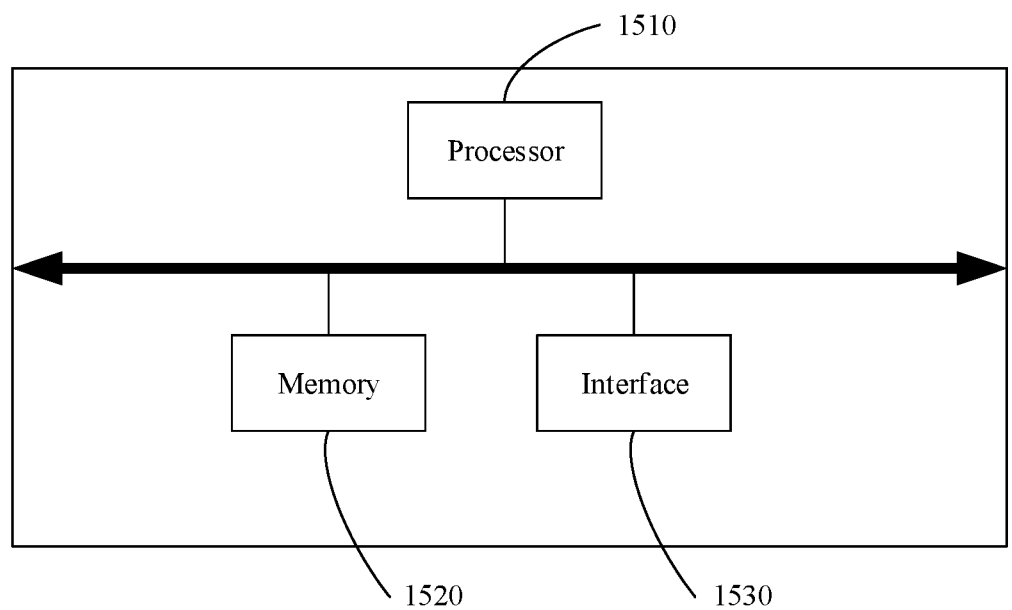
FIG. 15 is a schematic structural diagram of a core network device according to an embodiment of this application.

FIG. 15 is a schematic structural diagram of a core network device according to an embodiment of this application. The core network device may be the core network device in the foregoing embodiments and is configured to implement operations of the core network device in the foregoing embodiments.

As shown in FIG. 15, the core network device includes: a processor 1510, a memory 1520, and an interface 1530. The processor 1510, the memory 1520, and the interface 1530 are signal-connected.

A reference time point determining apparatus is located in the core network device, and a function of each unit may be implemented by the processor 1510 by invoking a program stored in the memory 1520. That is, the reference time point determining apparatus includes a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It will be appreciated that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   obtaining, by a core network device in a 3rd generation partnership project (3GPP) network, time information of first traffic with respect to a second clock, wherein the core network device is a session management function (SMF) network element;
   generating, by the core network device, time information of the first traffic with respect to a first clock based on the time information of the first traffic with respect to the second clock, a time offset between the first clock and the second clock, and a delay between a user plane function (UPF) network element in the 3GPP network and an access network device in the 3GPP network, wherein the first clock is a clock on which the 3GPP network is based, wherein the second clock is a clock on which time sensitive networking (TSN) is based, wherein the time information of the first traffic with respect to the first clock comprises a time point at which and/or a period in which a data packet of the first traffic arrives at the 3GPP network with respect to the first clock, and wherein the time information of the first traffic with respect to the second clock comprises a time point at which and/or a period in which the data packet of the first traffic arrives at the 3GPP network with respect to the second clock; and
   sending, by the core network device, the time information of the first traffic with respect to the first clock to the access network device.

2. The method according to claim 1, wherein the first traffic is uplink traffic, and the data packet of the first traffic arriving at the 3 GPP network includes the data packet of the first traffic arriving at a terminal; or
   wherein the first traffic is downlink traffic, and the data packet of the first traffic arriving at the 3GPP network includes the data packet of the first traffic arriving at the access network device.

3. A session management function (SMF) network element in a 3rd generation partnership project (3GPP) network, comprising:
   at least one processor;
   a non-transitory computer readable medium having processor-executable instructions stored thereon;
   wherein the at least one processor is configured to execute the processor-executable instructions to facilitate the following being performed by the SMF network element:
   obtaining time information of first traffic with respect to a second clock;
   generating time information of the first traffic with respect to a first clock based on the time information of the first traffic with respect to the second clock, a time offset between the first clock and the second clock, and a delay between a user plane function (UPF) network element in the 3GPP network and an access network device in the 3GPP network, wherein the first clock is a clock on which the 3GPP network is based, wherein the second clock is a clock on which time sensitive networking (TSN) is based, wherein the time information of the first traffic with respect to the first clock comprises a time point at which and/or a period in which a data packet of the first traffic arrives at the 3GPP network with respect to the first clock, and wherein the time information of the first traffic with respect to the second clock comprises a time point at which and/or a period in which the data packet of the first traffic arrives at the 3GPP network with respect to the second clock; and
   sending the time information of the first traffic with respect to the first clock to the access network device.

4. The SMF network element according to claim 3, wherein the first traffic is uplink traffic, and the data packet of the first traffic arriving at the 3GPP network includes the data packet of the first traffic arriving at a terminal; or
   wherein the first traffic is a downlink traffic, and the data packet of the first traffic arriving at the 3GPP network includes the data packet of the first traffic arriving at the access network device.

5. A communication system, comprising:
   a core network device in a 3rd generation partnership project (3GPP) network, wherein the core network device is a session management function (SMF) network element; and
   an access network device in the 3GPP network;
   wherein the core network device is configured to:
   obtain time information of first traffic with respect to a second clock;
   generate time information of the first traffic with respect to a first clock based on the time information of the first traffic with respect to the second clock, a time offset between the first clock and the second clock, and a delay between a user plane function (UPF) network element in the 3GPP network and the access network device, wherein the first clock is a clock on which the 3GPP network is based, wherein the second clock is a clock on which a time sensitive networking (TSN) is based, wherein the time information of the first traffic with respect to the first clock comprises a time point at which and/or a period in which a data packet of the first traffic arrives at the 3GPP network with respect to the first clock, and wherein the time information of the first traffic with respect to the second clock comprises a time point at which and/or a period in which the data packet of the first traffic arrives at the 3GPP network with respect to the second clock; and send the time information of the first traffic with respect to the first clock to the access network device; and wherein the access network device is configured to receive the time information of the first traffic with respect to the first clock.

6. The communication system according to claim 5, wherein the first traffic is uplink traffic, and the data packet of the first traffic arriving at the 3GPP network corresponds to the data packet of the first traffic arriving at a terminal.

7. The communication system according to claim 5, wherein the first traffic is downlink traffic, and the data packet of the first traffic arriving at the first network corresponds to the data packet of the first traffic arriving at the access network device.

* * * * *